United States Patent [19]

Omote et al.

[11] Patent Number: 5,361,280
[45] Date of Patent: Nov. 1, 1994

[54] METHOD FOR READING A NUCLEAR FUEL ASSEMBLY IDENTIFICATION CODE

[75] Inventors: Tatsuyuki Omote, Hitachi; Tomiharu Yoshida; Hideo Maki, both of Katsuta; Makoto Senoh, Naka; Fuminobu Takahashi, Katsuta; Kenji Tsuchita, Hitachiota, all of Japan

[73] Assignee: Hitachi, Ltd., Tokyo, Japan

[21] Appl. No.: 947,298

[22] Filed: Sep. 18, 1992

Related U.S. Application Data

[62] Division of Ser. No. 771,119, Oct. 4, 1991, Pat. No. 5,167,910, which is a division of Ser. No. 346,226, May 12, 1989, Pat. No. 5,089,213.

[30] Foreign Application Priority Data

May 2, 1988 [JP] Japan .................. 63-107628
May 2, 1988 [JP] Japan .................. 63-107629

[51] Int. Cl.$^5$ .................................. G21C 17/00
[52] U.S. Cl. .................. 376/248; 376/252; 376/452
[58] Field of Search ............ 376/245, 248, 252, 452, 376/260, 261

[56] References Cited

U.S. PATENT DOCUMENTS

| | | | |
|---|---|---|---|
| 4,119,489 | 10/1978 | Itoh et al. | 376/446 |
| 4,389,568 | 6/1983 | Dowdy et al. | 376/257 |
| 4,587,407 | 5/1986 | Ahmed et al. | 235/467 |
| 4,636,846 | 1/1987 | Villarreal | 376/248 |
| 4,822,987 | 4/1989 | Goldenfield et al. | 376/452 |
| 4,869,865 | 9/1989 | White et al. | 376/260 |
| 4,894,848 | 1/1990 | Lambert et al. | 376/261 |

FOREIGN PATENT DOCUMENTS

| | | | |
|---|---|---|---|
| 2395571 | 1/1979 | France . | |
| 3319102 | 11/1984 | Germany | 376/452 |
| 57-53688 | 3/1982 | Japan | 376/452 |
| 110994 | 7/1982 | Japan | 376/452 |
| 58-21238 | 4/1983 | Japan . | |
| 205354 | 10/1985 | Japan . | |
| 207095 | 10/1985 | Japan . | |
| 2091931 | 8/1982 | United Kingdom . | |

OTHER PUBLICATIONS

Remote Systems Technology, Conf. 33, Moffett, Nov. 1985, pp. 137–139.
Nuclear Technology, vol. 72, Mar. 1986, pp. 321–326.

Primary Examiner—Daniel D. Wasil
Attorney, Agent, or Firm—Antonelli, Terry, Stout & Kraus

[57] ABSTRACT

A nuclear fuel identification code reader has an optical sensor for detecting a nuclear fuel identification code marked on a fuel assembly and an ultrasonic wave sensor for detecting the nuclear fuel identification code. It further has first means for recognizing the nuclear fuel identification code based on information derived from the optical sensor and second means for recognizing the nuclear fuel identification code based on information derived from the ultrasonic wave sensor. When the nuclear fuel identification code cannot be recognized by the first means, the detection by the ultrasonic wave sensor and the recognition of the nuclear fuel identification code by the second means are effected. The nuclear fuel identification code can be recognized in a short time with a high accuracy.

8 Claims, 31 Drawing Sheets

FIG. 7

| | | | | |
|---|---|---|---|---|
| ○○○<br>○○○<br>0 | ○●○<br>○○○<br>1 | ○○●<br>○○○<br>2 | ○○○<br>●○○<br>3 | ○○○<br>○○●<br>4 |
| ○●○<br>○●○<br>5 | ○●●<br>○○○<br>6 | ○●○<br>○○●<br>7 | ○○●<br>○●○<br>8 | ○○○<br>○●●<br>9 |
| ●●○<br>○○○<br>A | ●○●<br>○○○<br>B | ●○○<br>●○○<br>C | ●○○<br>○●○<br>D | ●○○<br>○○●<br>E |
| ●●●<br>○○○<br>F | ●●○<br>●○○<br>G | ●●○<br>○●○<br>H | ●●○<br>○○●<br>I | ●○●<br>●○○<br>J |
| ●○●<br>○●○<br>K | ●○●<br>○○●<br>L | ●○○<br>●●○<br>M | ●○○<br>●○●<br>N | ●○○<br>○●●<br>O |
| ●●●<br>●○○<br>P | ●●●<br>○●○<br>Q | ●●●<br>○○●<br>R | ●●○<br>●●○<br>S | ●●○<br>●○●<br>T |
| ●●○<br>○●●<br>U | ●○●<br>●●○<br>V | ●○●<br>●○●<br>W | ●○●<br>○●●<br>X | ●○○<br>●●●<br>Y |
| ●●●<br>●●●<br>Z | | | | |

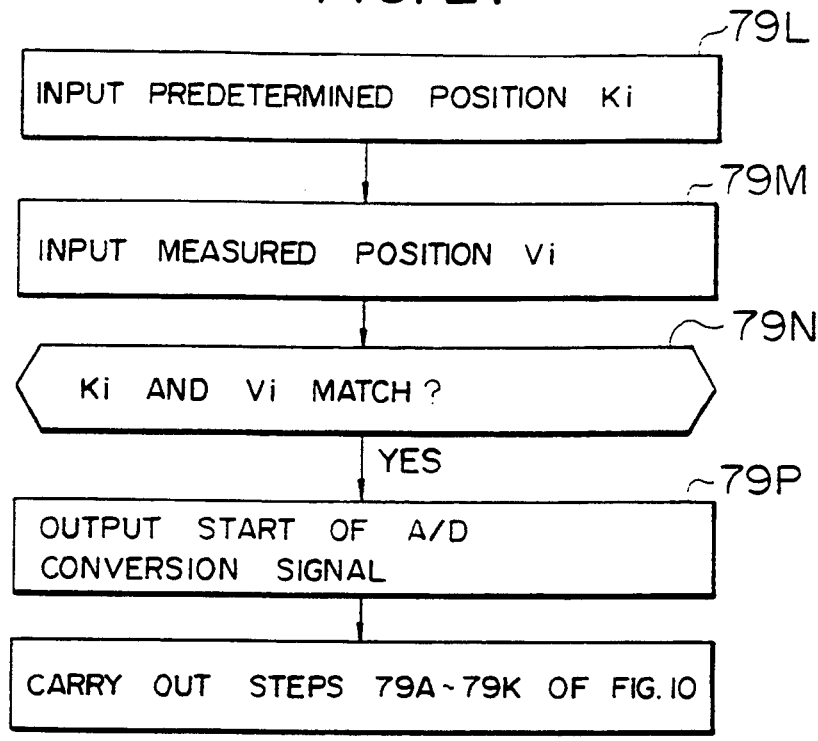
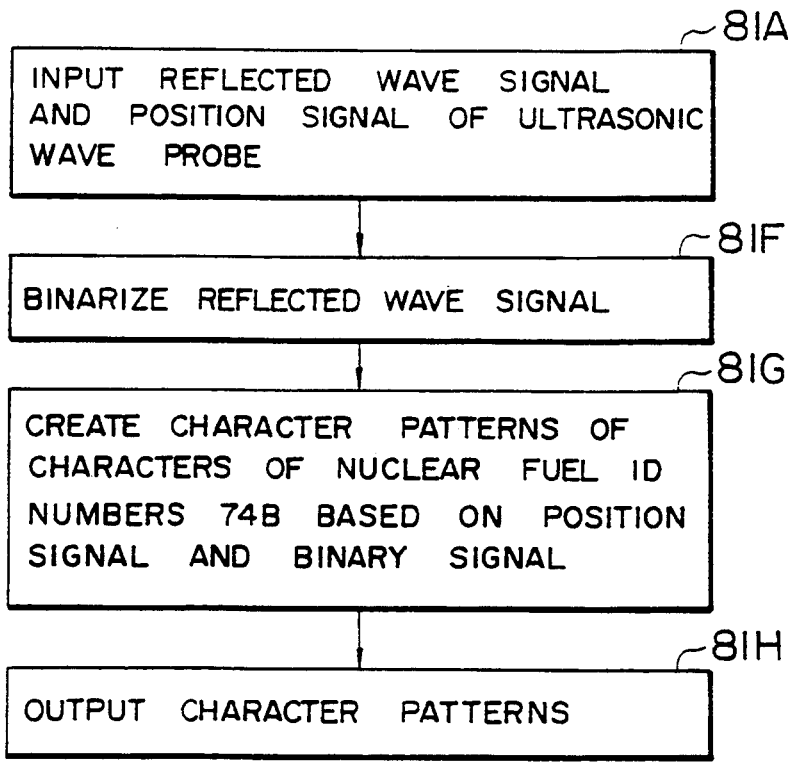

FIG. 40A
FIG. 40B
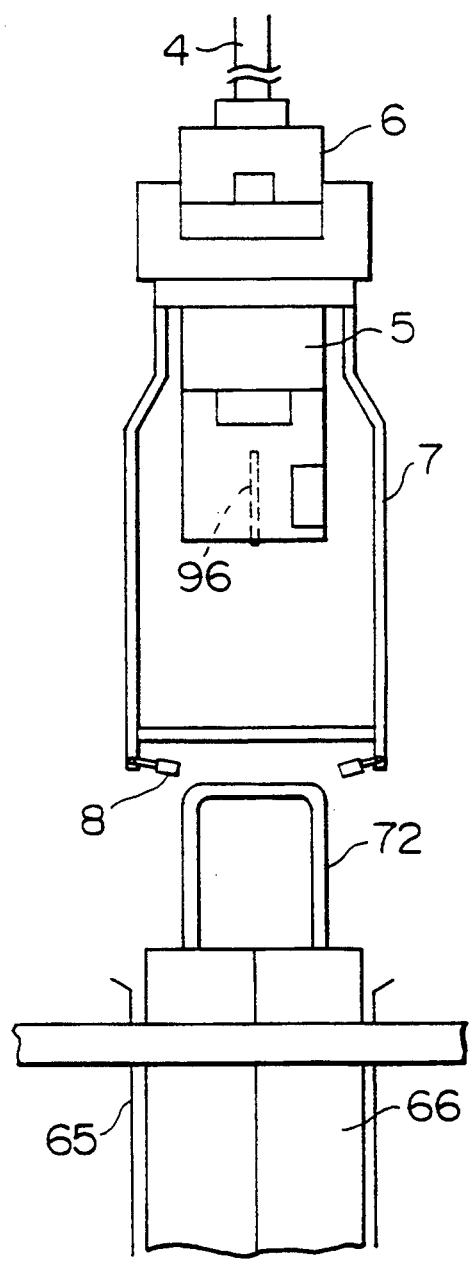
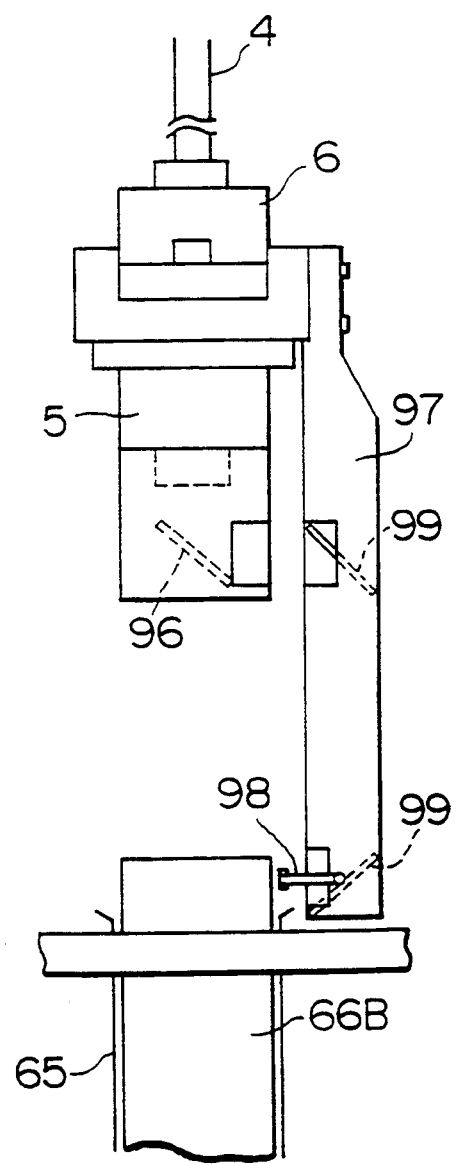

METHOD FOR READING A NUCLEAR FUEL ASSEMBLY IDENTIFICATION CODE

This application is a division of application Ser. No. 771,119, filed Oct. 4, 1991, now U.S. Pat. No. 5,167,910, which is a division of application Ser. No. 346,226, filed May 2, 1989, now U.S. Pat. No. 5,089,213, issued Feb. 18, 1992.

BACKGROUND OF THE INVENTION

The present invention relates to a nuclear fuel identification code reader and a fuel assembly, and more particularly to a nuclear fuel identification reader and a fuel assembly which are suitable for identification of a fuel assembly in a fuel storage pool.

In the past, the identification of a nuclear fuel identification number of a fuel assembly loaded a fuel storage pool has been effected by an operator by watching on a television monitor a video image taken by a marine TV camera. This is reported in Nuclear Technology, Vol. 72, March 1986, pp. 321–327.

In the prior art method in which the video image of the TV camera is monitored through the TV monitor, there are some cases where it is not possible to identify the fuel identification number marked on the fuel assembly if clad (soft clad primarily consisting of $Fe_2O_3$) is deposited on the fuel assembly.

A solution to the above problem is disclosed in JP-A-57-53688, particulary FIG. 4 thereof. Eddy current sensors are inserted into recesses formed on a top surface of a handle of the fuel assembly to detect the fuel identification number.

JP-A-60-207095 and JP-A-57-110994 disclose techniques to identify the fuel assembly by detecting a mark such as a groove formed at a top of the fuel assembly by ultrasonic wave.

SUMMARY OF THE INVENTION

It is an object of the present invention to provide a nuclear fuel identification code reader capable of identifying a nuclear fuel identification code marked on a fuel assembly in a short time and with a high accuracy.

It is another object of the present invention to provide a nuclear fuel identification code reader capable of checking loss of a fuel assembly stored in a fuel storage pool.

It is other object of the present invention to provide a nuclear fuel identification code reader capable of checking the presence of nuclear fuel in a stored fuel assembly.

The first characteristic feature of the present invention resides in the provision of an optical sensor and an ultrasonic wave sensor for detecting the nuclear fuel identification code, means for identify the nuclear fuel identification code based on the information derived from the optical sensor, and means for identifying the nuclear fuel identification code based on the information derived from the ultrasonic wave sensor. In this arrangement, the nuclear fuel identification code can be identified in a short time.

The second characteristic feature of the present invention resides in the provision of means for comparing a current recognition result for the nuclear fuel identification code with a past recognition result therefor. Thus, any loss of the stored fuel assembly can be checked.

The third characteristic feature of the present invention resides in the provision of means for photographing a Chelencoff light generated in the fuel assembly and means for image processing an image signal of the Chelencoff light photographed by said photographing means. Thus, the presence of the nuclear fuel in the stored fuel assembly can be readily checked.

BRIEF DESCRIPTION OF THE DRAWINGS

FIG. 7 illustrates a standard digital pattern of a nuclear fuel identification code of FIG. 5, FIG. 27 shows a processing process of a fuel number identification/discrimination means of FIG. 23, FIG. 28 shows a processing process of an ultrasonic wave signal processing means of FIG. 23.

DESCRIPTION OF THE PREFERRED EMBODIMENTS

The present invention was made based on the study of the techniques disclosed in JP-A-57-53688 and JP-A-60-207095.

In the eddy current sensor disclosed in JP-A-57-53688, a detection accuracy of the sensor is lowered when a groove narrower than a diameter of the eddy current sensor or a hole having a narrower diameter than the diameter of the eddy current sensor is to be detected. Characters of 8 mm square size are engraved in a handle of a fuel assembly. A width of those curved characters is as narrow as approximately 1.6 mm. Accordingly, the detection accuracy of the nuclear fuel identification number by the eddy current sensor is low. Since the diameter of the eddy current sensor is usually approximately 5-10 mm, the reduction of the detection accuracy is innevitable.

In the ultrasonic wave sensor disclosed in JP-A-60-207095, a signal processing time for detecting the nuclear fuel identification number is long and it is difficult to apply the sensor to a number of fuel assemblies in a fuel storage pool, which require a short response time. This is also true in a case where an eddy current sensor having a long signal processing time is used. JP-A-57-110994 is similar to JP-A-60-207095.

The present invention is intended to solve those problems.

Figure 2:
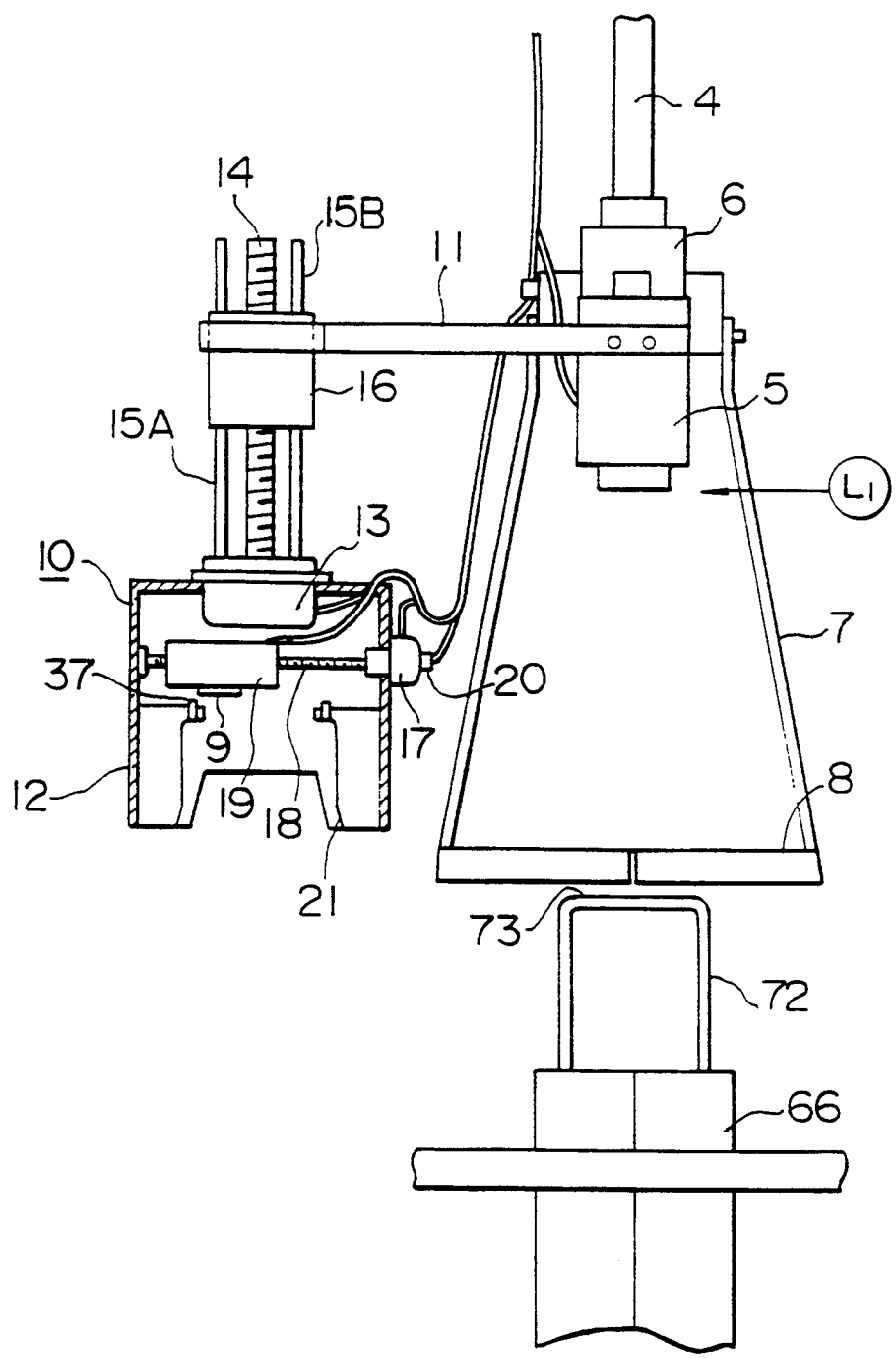
FIG. 2 shows an enlarged view of a portion II in FIGS. 1, 16 and 22.
Figure 3:
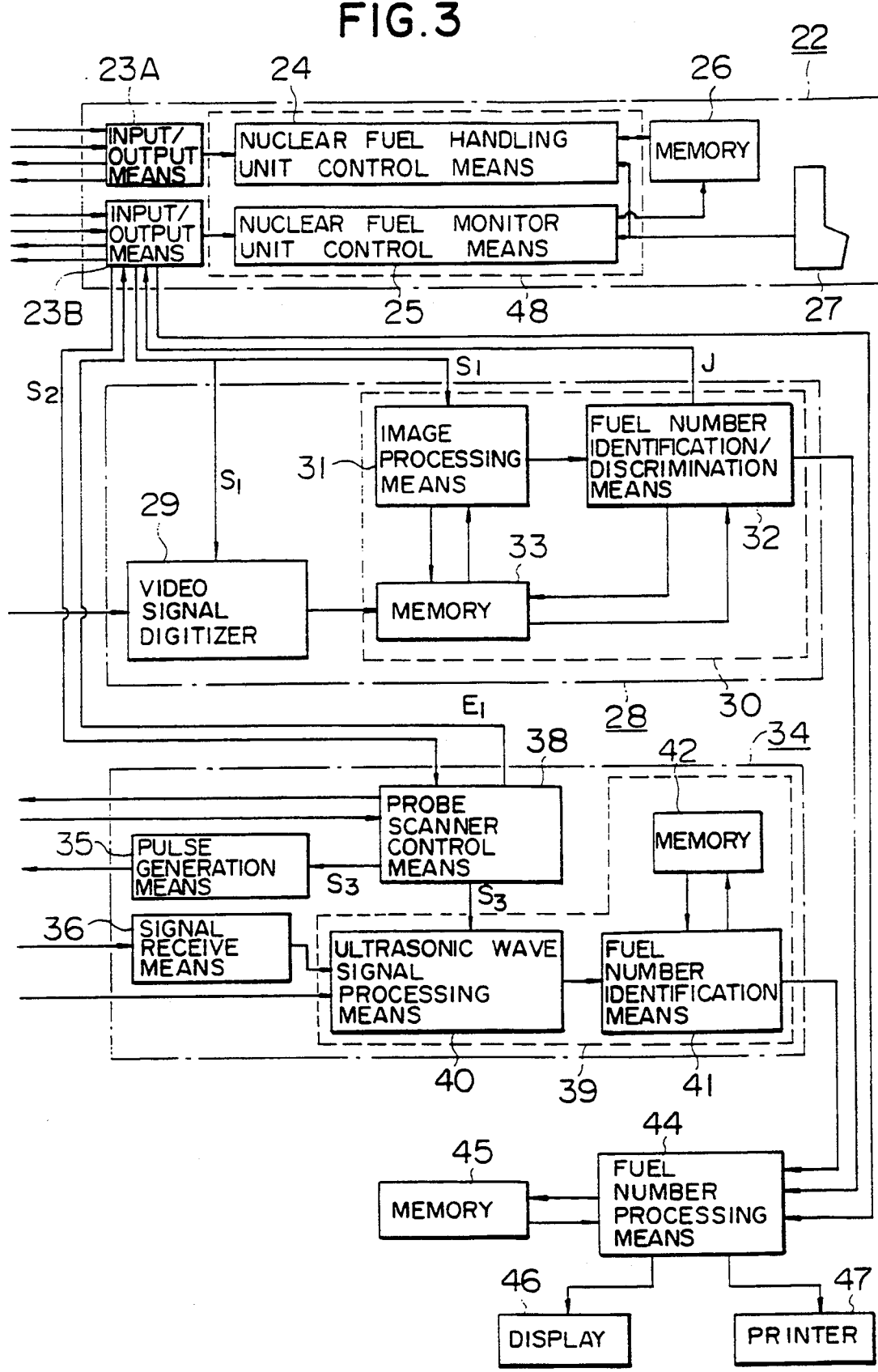
FIG. 3 shows a detailed block diagram of a nuclear fuel handling control unit, a nuclear fuel identification code monitor and a nuclear fuel identification code processing unit of FIG. 1.

One embodiment of the nuclear fuel identification code reader of the present invention is now explained with reference to FIGS. 1, 2 and 3. The nuclear fuel identification code reader of the present embodiment comprises a sensor handling unit 1, an ITV camera 5, an ultrasonic wave probe 9, an ultrasonic wave probe scanner 10, a nuclear fuel handling control unit 22, a nuclear fuel identification code monitor 28 and a nuclear fuel identification code processing unit 43. The sensor handling unit 1 utilizes a portion of a nuclear fuel handling unit 51.

The nuclear fuel handling unit 51 is used to move a used fuel assembly 66 in a fuel storage pool 63. The used fuel assembly 66 is taken out of a core of a nuclear reactor and loaded and stored in a fuel rack 65 arranged in the fuel storage pool 63. The fuel storage pool 63 is filled with water 64. The fuel rack 65 is arranged under a water level of the water 64. The nuclear fuel handling unit 51 is constructed to cross the fuel storage pool 63. The nuclear fuel handling unit 51 includes a movable truck 52, a laterally movable truck 53, a grapple 54, a clamp 55 and a hoist 56. The movable truck 52 is driven by a drive motor 58 on a pair of rails 57 arranged on both sides of the fuel storage pool 63. The laterally movable truck 53 has the grapple 54, the clamp 55 and the hoist 56 and is driven by a drive motor 60 on a pair of rails 59 arranged on the movable truck 52. The grapple 54 is raised and fallen by the hoist 56 and a drive motor 62. The grapple 54 is rotated by a drive motor 61 to allow adjustment of an angle of the clamp 55 in a horizontal plane. The drive motor 61 is mounted on the laterally movable truck 53. The grapple 54 is constructed by several linked expandable pipes. The lamp 55 is mounted at the bottom end of the grapple 54. A direction of movement of the movable truck 52 is represented by X, a direction of movement of the laterally movable truck 53 is Y, the elevation of the grapple 54 is represented by $Z_1$ and the rotation is represented by $\theta_1$. Position signals representing the displacements X, Y, $Z_1$ and $\theta_1$ are detected by synchronous signal generators (not shown) mounted on the respective drive shafts of the fuel handling unit 51.

The sensor handling unit 1 has a hoist 2, a drive motor 3 and a grapple 4. The hoist 2, the drive motor 3 and the grapple 4 are mounted on the movable truck 53. A drive motor (not shown) which corresponds to the drive motor 61 and serves to rotate the grapple 4 is mounted on the laterally movable truck 53. The grapple 4 is also constructed by several linked expnadable pipes. The grapple 4 is moved up and down by the hoist 2 and the drive motor 3. The elevation of the grapple 4 is represented by $Z_2$ and the rotation is represented by $\theta_2$. Position signals representing the displacements $Z_2$ and $\theta_2$ are detected by synchronous signal generators (not shown) mounted on the respective drive shafts of the sensor handling unit 1.

A mount table 6 is arranged at the bottom end of the grapple 4. The ITV camera 5 is mounted on the mount table 6. Four downwardly extending frames 7 are fixed to the mount table 6 by screws. An illumination device 8 is arranged at the bottom ends of the frames 7. The ultrasonic wave probe scanner 10 is mounted on the mounted table 6 by an arm 11.

A detailed structure of the ultrasonic wave probe scanner 10 is explained below. A drive motor 13 is mounted at a top of a bottom-opened box 12. An upwardly extending rotary screw 14 linked to a rotation shaft of the drive motor 13 meshes with a nut (not shown) mounted on a support member 16 which is mounted on the arm 11. A pair of guide members 15A and 15B which hold the rotary screw 14 therebetween are mounted on the drive motor 13. The guide members 15A and 15B extend through the support member 16 so that they are vertically movable. Another drive motor 17 is mounted on a side of the box 12 which faces the ITV camera 5. A rotary screw 18 horizontally arranged in the box 12 has one end thereof linked to a rotation shaft of the drive motor 17 and the other end thereof supported by a bearing (not shown) mounted on the side of the box 12. A probe holding table 19 engages with the rotary screw 18. Two ultrasonic wave probes 9 are mounted on the probe holding table 19. They are arranged to traverse the rotary screw 18. A pair of fixing guides 21 is arranged in the box 12. An encoder 20 measures the displacement of the ultrasonic wave probe 9 along the axis of the rotating screw 18.

The ITV camera 5 and the ultrasonic wave probe 9 constitute a nuclear fuel identification code detection means.

The nuclear fuel handling control unit 22 comprises input/output means 23A and 23B, a nuclear fuel handling unit control means 24, a nuclear fuel monitor unit control means 25, a memory 26 and a console panel 27. The input/output means 23A supplies control signals to the drive motors 58, 60, 61 and 62 and receives the position signals representing the displacements X, Y, $Z_1$ and $\theta_1$ from the corresponding synchronous signal generators (not shown). The intput/output means 23B supplies control signals to the drive motors 3, 58 and 60 and the drive motor (not shown) which drives the grapple 4, and receives the position signals representing the displacements X, Y, $Z_2$ and $\theta_2$ from the corresponding synchronous signal generators (not shown). The input/output means 23A inputs and outputs the signals related to the nuclear fuel handling unit control means 24, and the input/output means 23B inputs and outputs the signals related to the nuclear fuel monitor unit control means 25. The nuclear fuel handling unit control means 24 and the nuclear fuel monitor control means 25 are included in a computer 48.

The nuclear fuel identification code monitor 28 has a video signal digitizer 29 and a signal processing microprocessor 30. The microprocessor 30 has a memory 33, an image processing means 31 and a nuclear fuel number identification/discrimination means 32. The video signal digitizer 29 is a kind of A/D converter which converts a video signal (analog signal) sent from the ITV camera 5 to a digital signal. The video signal digitizer 29. The image signal processing means 31 and the fuel number identification/discrimination means 32 are coupled to the input/output means 23B. The nuclear fuel identification code monitor 28 thus constructed identifies the nuclear fuel identification code based on the video signal derived from the ITV camera 5.

The nuclear fuel identification code monitor 34 comprises a pulse generation means 35, a signal receive means 36, a probe scanner control means 38 which is constructed by a microprocessor, and a signal processing microprocessor 39. The microprocessor 39 has an ultrasonic wave signal processing means 40, a nuclear fuel number identification means 41, and a memory 42. The pulse generation means 35 is connected to the ultrasonic wave probe 9 and the probe scanner control means 38. The signal receive means 36 is connected to the ultrasonic wave probe 9 and the ultrasonic wave signal processing means 40. The ultrasonic wave signal processing means 40 is coupled to the encoder 20. The probe scanner control means 38 is connected to the drive motors 13 and 17, the encoder 20 and a limit switch 37, and further to the input/output means 23B. The nuclear fuel identification code monitor 34 thus constructed identifies the nuclear fuel identification code based on the reflected wave of the ultrasonic wave derived from the ultrasonic wave probe 9.

The nuclear fuel identification code processing unit 43 comprises a fuel number processing means 44 and a memory 45. A numeral 46 denotes a display and a numeral 47 denotes a printer. The display 46 may be mounted on the console panel 27.

Figure 4:
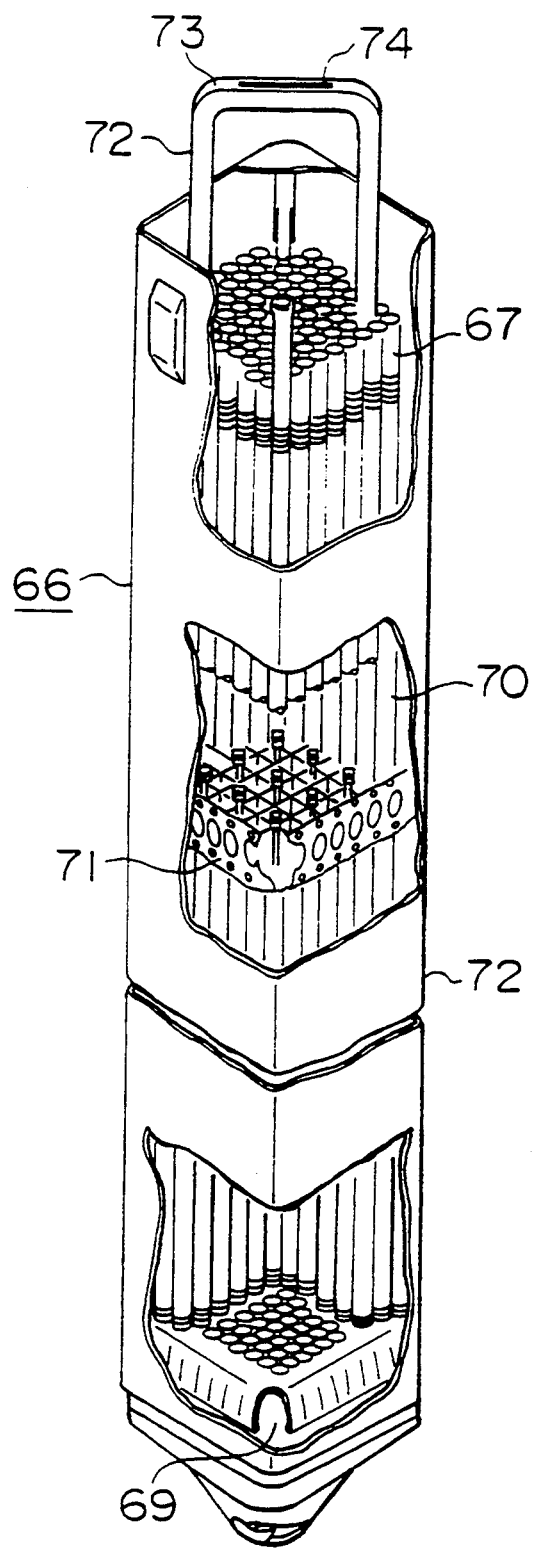
FIG. 4 shows a perspective view of a fuel assembly of FIG. 1.
Figure 5:
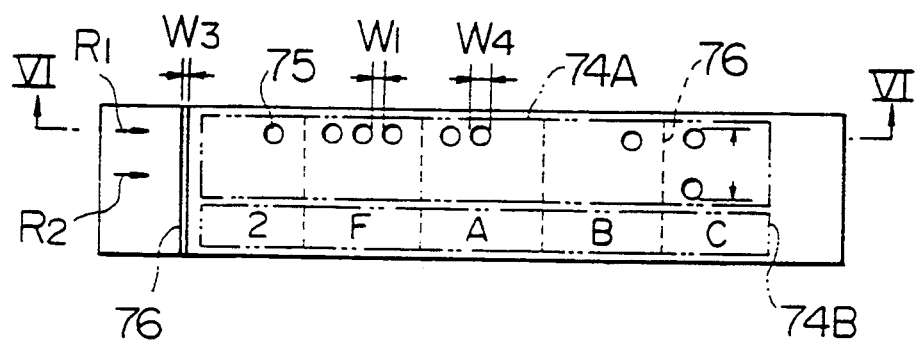
FIG. 5 shows a plan view of a handle of FIG. 4.
Figure 6:
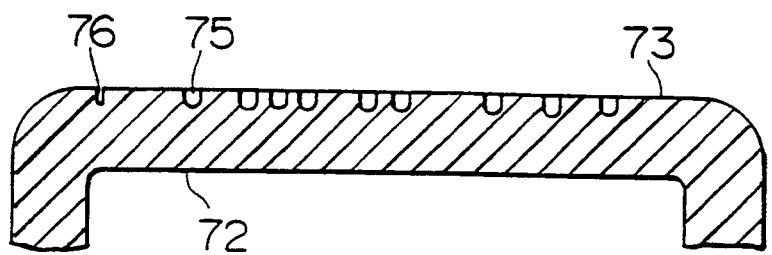
FIG. 6 shows a VI—VI sectional view of FIG. 5.

A structure of the fuel assembly 66 loaded in the fuel rack 65 is explained with reference to FIG. 4. The fuel assembly 66 loaded in the fuel rack 65 is an assembly of used fuel which is taken out of a center of a boiled-water type nuclear reactor. The fuel assembly 66 comprises an upper tie plate 67, a lower tie plate 69, a plurality of fuel rods 70 and a plurality of fuel spacers 71. The top and bottom ends of the fuel rods 70 are held by the upper tie plate 67 and the lower tie plate 69. The fuel spacers 71 are arranged axially of the fuel assembly 66 to keep a predetermined spacing between the fuel rods 70. A channel box 72 mounted on the upper tie plate 67 surrounds a bundle of fuel rods 70 supported by the fuel spacers 71. The upper tie plate 67 has a handle 72 arranged at the top thereof. A nuclear fuel identification number 74 is marked on the top 73 of the handle 72. As shown in FIGS. 5 and 6, the nuclear fuel identification number 74 includes a nuclear fuel identification number 74A coded by recesses 75 having circular cross-sections, and a nuclear fuel identification number 74B which is a combination of alphanumeric characters. Those two types of nuclear fuel identification numbers are marked in parallel on the top 73 of the handle 72. The nuclear fuel identification number 74B can be recognized by a human when he/she looks it but the nuclear fuel identification number 74A cannot be recognized by the human by just looking it. Both of the nuclear fuel identification numbers 74A and 74B are marked by engraving on the top 73 of the handle 72. The nuclear fuel identification number 74A is a combination of the recesses 75 which corresponds to the nuclear fuel identification number 74B. The cross-section of the recess 75 need not necessary be circular but it may be trianglar, square or rectangular, or even oval. In the nuclear fuel identification number 74A, each area sectioned by broken lines 76 corresponds to one character. In FIG. 5, the nuclear fuel identification number 74A represents "2FABC". Each coded symbol of the nuclear fuel identification number 74A is represented by the combination of up to six recesses 75 (two lines of three recesses). Each symbol of the nuclear fuel identification number 74A is a digital signal represented by the presence or absence of the recess 75. FIG. 7 shows a correspondence between the digitized symbols representing the nuclear fuel identification number 74A and the alphanumeric characters (0-9, A-Z). In FIG. 7, the black dot represents the presence of the recess 75 and a white dot represents the absence of the recess 75. It is possible to digitize 36 alphanumeric characters by arranging six recesses 75 (two lines of three recesses) as shown in FIG. 7. A plurality of digital symbols shown in FIG. 7 may be arranged on the top 73 in combination with the characters of the nuclear fuel identification number 74B. Assuming that a diameter of the recess 75 is approximately 1 mm and a spacing $W_1$ between the recesses 75 in one digital symbol is at least approximately 1 mm, the presence or absence of the recess 75 can be detected by the ultrasonic wave. Since a spacing $W_2$ between lines of recesses 75 is approximately 3 mm, the nuclear fuel identification number 74A and the nuclear fuel identification number 74B can be marked in parallel on the top 73 having a width of approximately 12 mm.

A recess 76 which is used as a reference to read the nuclear fuel identification number 74A is formed on the top 73 of the handle 72. The recess 76 is orthogonal to the side of the handle 72 and it is positioned on the left of the first digital symbol of the nuclear fuel identification number 74A. Without the recess 76, the nuclear fuel identification code monitor 34 cannot specify the nuclear fuel identification number 74A detected by the ultrasonic wave. In the example shown in FIG. 5, the nuclear fuel identification number 74A may be read as either "2FABC" or "CBAF2". If it is determined that the nuclear fuel identification number 74A is to be read from the end adjacent to the recess 76, the number 74 is read as "2FABC". A width $W_3$ of the recess 76 is either wider or narrower than a width $W_4$ (diameter) of the recess 75 so that the nuclear fuel identification code monitor 34 can easily discriminate the recess 75 of the digital symbol and the recess 76 of the read reference. The recess 76 need not be linear but it may be circular, triangular or square in cross-section so long as it is positioned on the left of the lines of recesses 75.

The fuel assembly 66 having the nuclear fuel identification numbers 74A and 74B marked in parallel on the top 73 of the handle 72 is loaded into the center of the boiled-water type nuclear reactor after the used fuel assembly 66 has been removed from the center of the reactor.

The operation of the nuclear fuel identification code reader of the present invention is non explained.

An operator specifies, through the console panel 27, the operation of the nuclear fuel handling or the operation of the detector for the nuclear fuel identification code. The specified operation signal is supplied to the computer 48. If the former operation is specified, the nuclear fuel handling unit control means 24 is activated, and if the latter operation is specified, the nuclear fuel monitor control means 25 is activated.

It is now assumed that the specified operation is the operation of nuclear fuel handling. Before the function of the nuclear fuel handling unit control means 24 is explained, the operation of the nuclear fuel handling unit 51 in the nuclear fuel handling operation is briefly explained. A plurality of used free assemblies 66 are carried to a predetermined postion in the fuel storage pool 63 from the top thereof while they are loaded in a container. Then, the movable truck 52 and the laterally movable truck 53 are driven to move the clamp 55 above the container. As the grapple 54 descends, the clamp 55 is lowered to the position of the handle 72 of the fuel assembly 66 in the container. After the clamp 55 has held the handle 72, the grapple 54 is raised. When the bottom end of the fuel assembly 66 reaches a level which is a predetermined distance above the top end of the fuel rack 65, the elevation of the grapple 54 is stopped. The movable truck 52 and the laterally movable truck 53 are again driven to move the fuel assembly 16 to a level which is a predetermined distance (specified by the operator through the console panel 27) above the fuel rack 65. When it reaches that level, the grapple 54 is lowered to load the fuel assembly 66 to a predetermined position in the fuel rack 65. The above movement is referred as a movement ①. When the fuel assembly is taken out of the fuel storage pool 63 for fuel processing, the opposite movement (movement ②) is carried out. Namely, the fuel assembly 66 taken out of the fuel rack 65 is loaded into the container. The clamp 55 may be moved, while it does not clamp the fuel assembly 66, from the position of the fuel rack 65 to other position (movement ③), from the position of the fuel rack 65 to the position of the container (movement ④), of from the position of the container to the position of the fuel rack 65 (movement ⑤).

The memory 26 stores data relating to the loading status of the fuel assembly 66 at the respective positions (X-Y ID coordinate) of the fuel rack 65. The memory 26 stores "0" for the position at which the fuel assembly 66 is not loaded, and "1" for the position at which the fuel assembly 66 is loaded. The ID coordinate is not represented by absolute distances on X and Y axises but it is represented by the code applied to the fuel assembly load position.

The position signals representing the displacements X, Y, $Z_1$ and $\theta_1$ measured by the synchronous signal generators are converted to the digital signals by the input/output means 23A and they are supplied to the nuclear fuel handling unit control means 24 of the computer 48. A limit switch (not shown) mounted on the nuclear fuel handling unit 51 detects when the grapple 55 reaches a grapple upper limit level A and a mount level B of the fuel assembly (in the fuel rack 65 and the container). The detection signal is supplied to the computer 48. The nuclear fuel handling unit control means 24 uses those signals to control and monitor the position of the nuclear fuel handling unit 51.

When the used fuel assembly 66 is to be moved in the fuel storage pool 63, the operator specifies N target positions (X-Y ID coordinate) necessary for the fuel handling unit 51 to move the fuel assembly 66, through the console panel 27. The $P_I$ or P which is shown in JP-B-58-21238, column 6, lines 8-10 is also specified through the console panel 27. The nuclear fuel handling unit control means 24 discriminates in the manner described and shown in JP-B-58-21238, column 7, line 26 to column 8, line 11 and FIGS. 3 and 4. That is, the load status of the fuel assembly 66 at the target position, the correctness of the data ($P_I$ or P) specified by the operator and the open/close status of the clamp 55 are checked, and if the check result is normal, the control signal for the corresponding movement (one of the movements ①-⑤) is supplied to the nuclear fuel handling unit 51 to control the corresponding movement. If the check result is not normal, the nuclear fuel handling unit control means 24 inhibits the start of the nuclear fuel handling unit 51. When the fuel assembly 66 is moved by the nuclear fuel handling unit 51, the data on the load status of the fuel assembly 66 at the respective positions of the fuel rack 65, which is stored in the memory 26, is updated as the movement proceeds.

Figure 8:
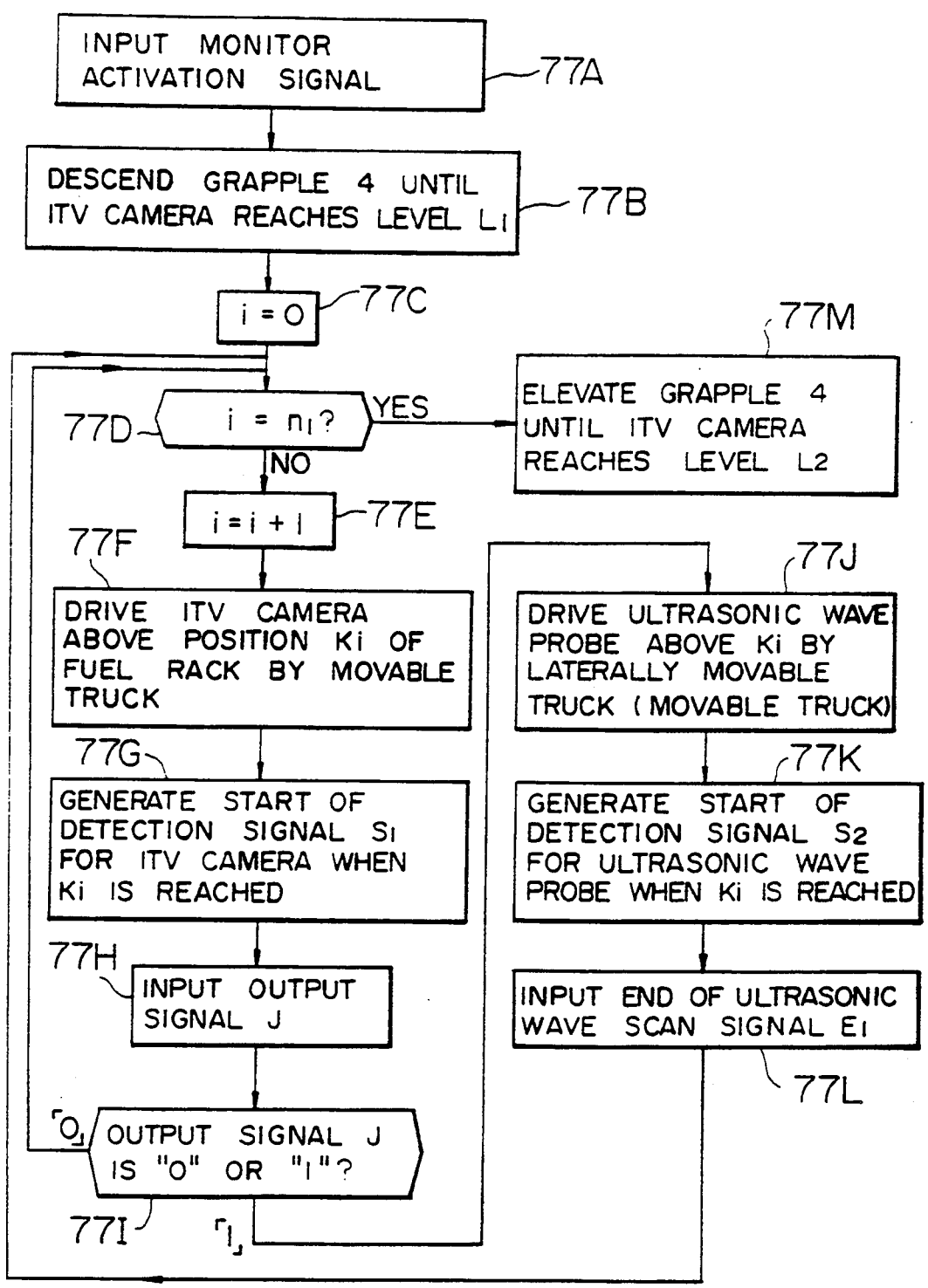
FIG. 8 shows a processing of fuel monitor control means of FIG. 3.

When the operator specifies the operation of the detector for the nuclear fuel identification code, the nuclear fuel monitor unit control means 25 moves the sensor handling unit 1 in accordance with the process (steps 77A-77M) of FIG. 8. This is explained in detail below. When a monitor operation signal is supplied from the console panel 27 (step 77A), a step 77B is carried out.

The position signals representing the displacements X, Y, $Z_2$ and $\theta_1$ measured by the respective synchonous signal generators are converted to the digital signals by the input/output means 23B and they are supplied to the nuclear fuel monitor control means 25 of the computer 48. Levels $L_1$ and $L_2$ are detected by the limit switch (not shown) mounted on the sensor handling unit 1. Those detection signals are supplied to the nuclear fuel monitor control means 25, which uses those signals to control and monitor the position of the sensor handling unit 1. The level $L_1$ (FIG. 2) is set at the bottom end of the ITV camera 5 when the nuclear fuel identification number is monitored so that the illumination device 8 does not contact to the top 73 of the handle 72 of the fuel assembly 66 in the fuel rack 65. The level $L_2$ is set substantially above the level $L_1$, at a position where the ITV camera 5 is positioned when the nuclear fuel identification number is not detected. The sequence of the fuel assemblies 66 for which the nuclear fuel identification numbers are detected is predetermined and stored in the memory 26. The sequence is shown in FIG. 1 by a chain line 49 starting at a point $K_1$. It is in the order of the positions $K_i$ (i=1, 2, ... $n_1$) shown in the X-Y ID coordinate for the fuel rack 65.

In a step 77B, the grapple 4 is lowered, and when the bottom end of the ITV camera 5 reaches the level $L_1$, the descend of the grapple 4 is stopped. Then, i is set to "1" (step 77C). Whether i=$n_1$ or not is checked (step 77D). If it is, a step 77E is carried out, and if it is not, a step 77M is carried out. In a step 77F following to the step 77E, the movable truck 52 and the laterally movable truck 53 are driven so that the ITV camera 5 reaches on the fuel assembly 66 which is at the position $K_i$ for which the nuclear fuel identification number is to be detected. When i=1, the ITV camera 5 is set to the start position $K_1$. When the ITV camera 5 reaches the position $K_i$, a start of detection signal $S_1$ for the nuclear fuel identification number 74B by the ITV camera 5 is produced (step 77G). The start of detection signal $S_1$ is supplied to the nuclear fuel identification code monitor 28, the ITV camera 5 and the illumination device 8. When the nuclear fuel identification code monitor 28 receives the start of detection signal $S_1$, it starts to receive and process the video signal produced by the ITV camera 5. Upon receipt of the signal $S_1$, the ITV camera 5 starts to pick up the image and the illumination device 8 is turned on. The image pick-up operation of the ITV camera 5 and the turn-on of the illumination device 8 may be started by the input of the signal $S_1$ at the position $K_1$ and continued until the image pick-up at the position $K_n$ is completed, instead of repetitively turning on and off at each position. In a step 77H, a discrimination signal J is received. The discrimination signal J is produced by the nuclear number identification/discrimination means 32 when the processing of the video signal relating to one fuel assembly 66 is completed in the nuclear fuel identification code monitor 28. The fuel member identification/discrimination means 32 produces a "0" discrimination signal J when all characters of the fuel identification number 74B detected by the ITV camera 5 are recognized by the image processing, and produces a "1" discrimination signal J when all characters are not recognized. After the step 77H, whether the discrimination signal J is "1" or "0" is checked (step 77I). If the discrimination signal J is "0", a step 77D is carried out, and if the signal J is "1", a step 77J is carried out In the step 77J, the laterally movable truck 53 (or the movable truck 52) is driven to move the ultrasonic wave probe 9 on the position $K_i$. When the ultrasonic wave probe 9 reaches the position $K_i$, a start of detection signal $S_2$ for the nuclear fuel identification number 74A by the ultrasonic wave probe 9 is produced (step 77K). The start of detection signal $S_2$ is supplied to the probe scanner control means 38 of the nuclear fuel identification code monitor 34 to effect the detection of the nuclear fuel identification number 74A by the ultrasonic wave probe 9 and the recognition of the nuclear fuel identification number 74A by the nuclear fuel identification code monitor 34. The probe scanner control means 38 produces an end of ultrasonic wave scan signal $E_1$ when the scan of the ultrasonic wave probe 9 to detect the fuel identification number 74A is over. When the nuclear fuel monitor control unit 25 receives the end signal $E_1$ (step 77L), it carries out the decision of the step 77D. If the decision in the step 77D is YES, the grapple 4 is elevated to elevate the ITV camera 5 to the level $L_2$ (step 77M). In this manner, the nuclear fuel identification numbers of all fuel assemblies 66 in the fuel storage pool 63 are monitored.

The nuclear fuel monitor control means 25 drives the ITV camera 5 which is the optical sensor for the nuclear fuel identification number onto the fuel assembly 66 under consideration, and when the fuel identification number 74B detected by the ITV camera 5 is hard to be recognized, the ultrasonic wave probe 9 which is the ultrasonic wave sensor is driven onto the fuel assembly 66 to detect the fuel identification member 74A.

The operation of the nuclear fuel identification code monitor 28 when it receives the start of detection signal $S_1$ produced by the nuclear fuel monitor unit control means 25 is explained. When the start of detection signal $S_1$ is received, the video signal digitizer 29 starts the A/D conversion of the video signal for the top 73 of the handle 72 picked up by the ITV camera 5. The image signal converted to the digital signal by the video signal digitizer 29 is supplied to the memory 33 in 1/30 second and stored therein.

Figure 9:
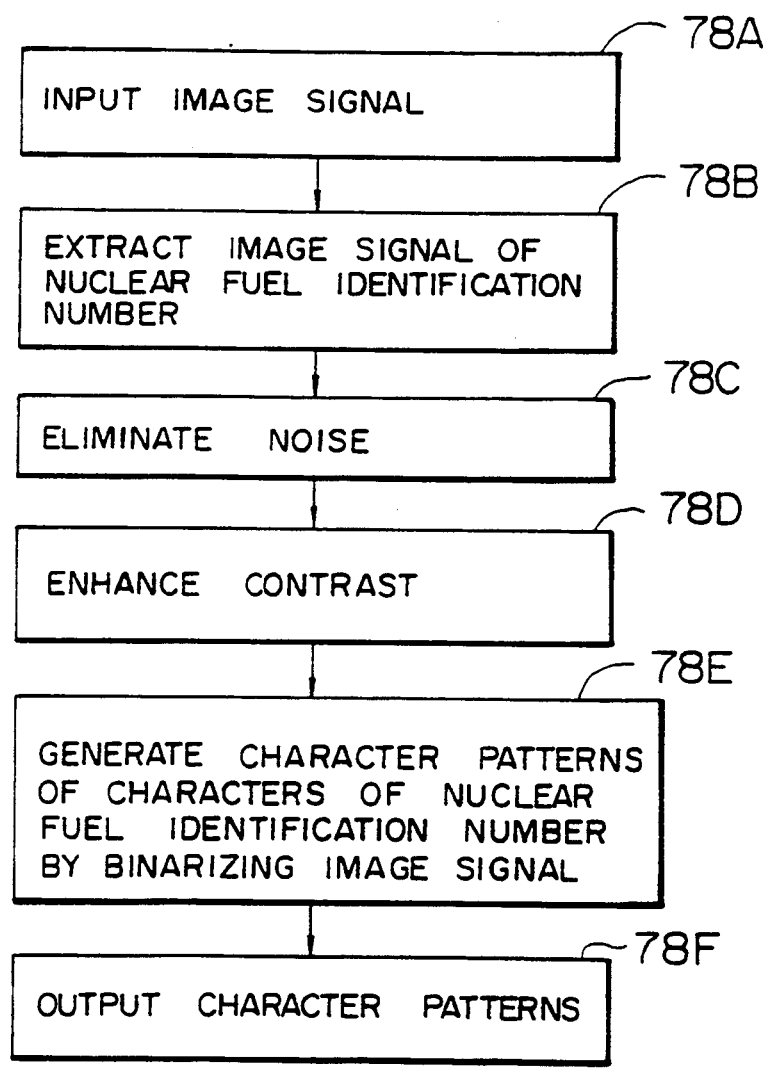
FIG. 9 shows a processing process of an image processing means 31 of FIG. 3.

The image processing means 31 carries out the process shown in FIG. 9. Upon receipt of the start of detection signal $S_1$, the image processing means 31 receives the video signal stored in the memory 33 (step 78A). It extracts the image signal of the nuclear fuel identification number 74B marked on the fuel assembly 66 under consideration, from the input image signal (step 78B). The extracted image signal is processed for noise elimination (step 78C) and contrast enhancement (step 78D). Then, the image signal is binarized to generate character patterns for all characters ($n_2$, $n_2=5$ in the present embodiment) of the detected nuclear fuel identification number 74B (step 78E). Those character patterns are generated as two-dimension character patterns $P_{jk}(l)$ (j=1−M, k=1−N, l=1−$n_2$) having M×N picture elements The $n_2$ generated character patterns are supplied to the fuel number identification/discrimination means 32 in the sequence of the characters of the nuclear fuel identification number 74B (step 78F).

Figure 10:
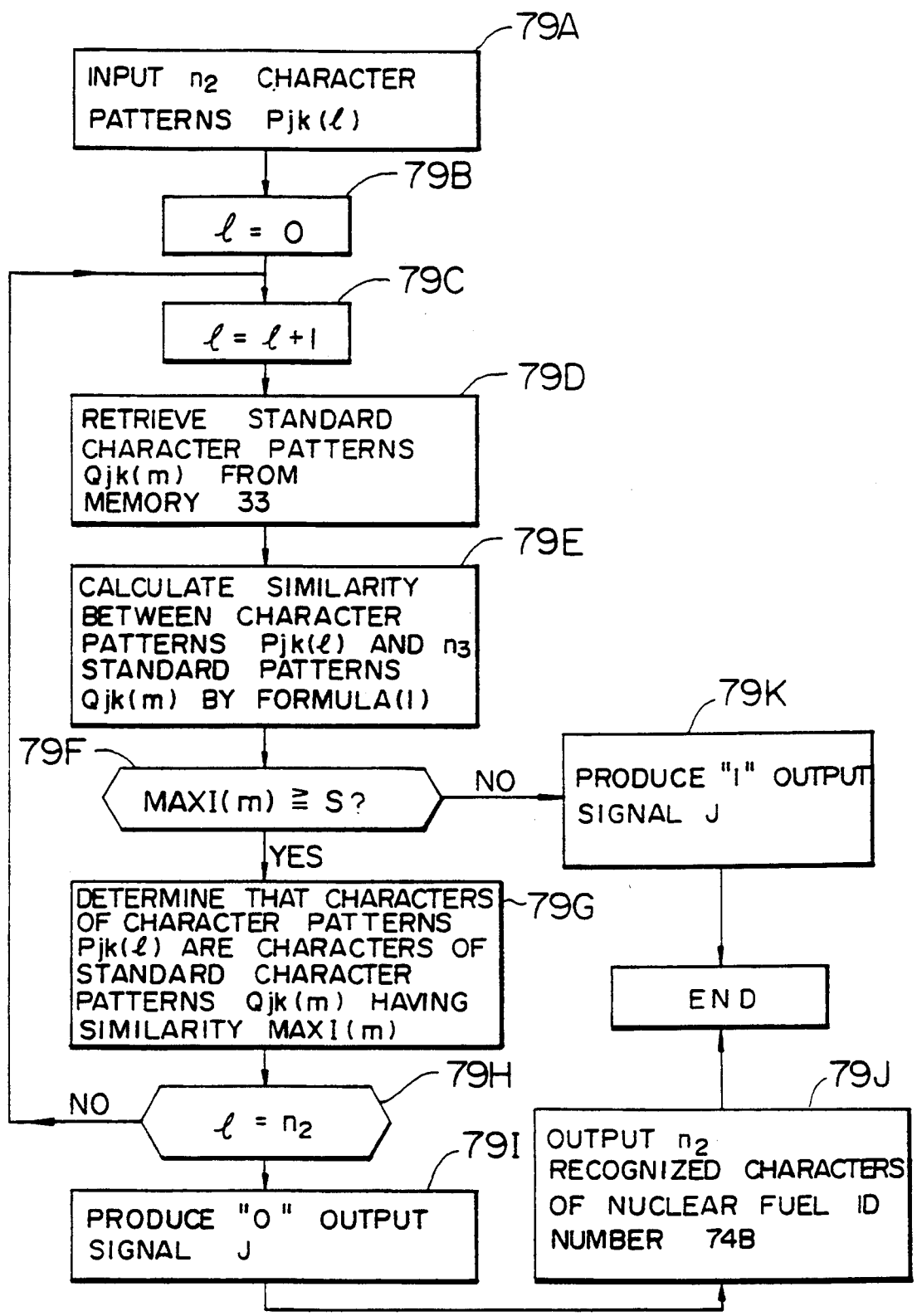
FIG. 10 shows a processing process of a fuel number identification/discrimination means of FIG. 3.
Figure 11:
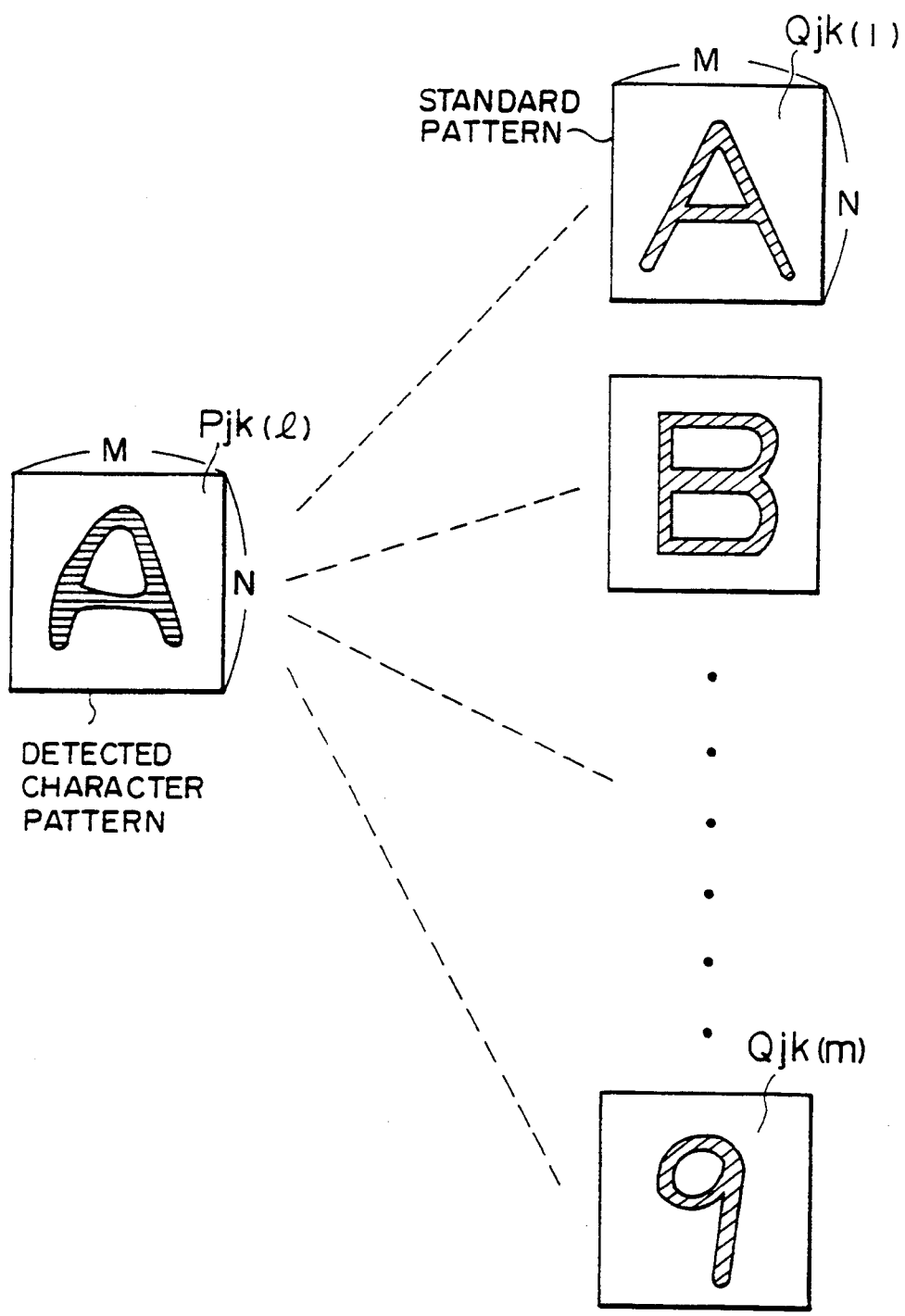
FIG. 11 shows a detected character pattern and a standard character pattern.

When the nuclear fuel number identification/discrimination means 32 receives the character patterns of the characters of the nuclear fuel identification number 74B, it carries out a process comprising steps 79A–79K shown in FIG. 10. The nuclear fuel number identification/discrimination means 32 receives the $n_2$ character patterns $P_{jk}(l)$ (step 79A) and carries out the steps 79B and 79C to read $n_3$ standard character patterns $Q_{jk}(m)$ from the memory 33. In the present embodiment, 36 standard character patterns $Q_{jk}(m)$ (m=1−$n_3$) including 0–9 and A–Z shown in FIG. 11 are stored in the memory 33, and $n_3=36$. Those standard character patterns correspond to the engraved characters of the nuclear fuel identification number 74B.

In a step 79E, a similarity I(m) between the character patterns $P_{jk}(l)$ and the $n_3$ standard character patterns $Q_{jk}(m)$ are calculated in accordance with a formula (1).

$$I(m) = \frac{\sum_{j} \sum_{k} P_{jk}(l) \cdot Q_{jk}(m)}{\left[\sum_{j} \sum_{k} \{P_{jk}(l)\}^2\right]^{1/2} \cdot \left[\sum_{j} \sum_{k} \{Q_{jk}(m)\}^2\right]^{1/2}} \quad (1)$$

The similarity I(m) calculated in accordance with the formula (1) is 1.0 when the character patterns $P_{jk}(l)$ and the standard character patterns $Q_{jk}(m)$ fully match. It does not exceed 1.0. In a step 79F, whether a maximum one (max I(m)) of the I(m) calculated for the character patterns $P_{jk}(l)$ is larger than a predetermined threshold S or not. When max I(m) is close to 1.0, it indicates that the ITV camera 5 has detected the characters of the nuclear fuel identification number 74 to a sufficient extent to permit the recognition. When max I(m) is around 0.6, it means that the characters of the nuclear fuel identification number 74B cannot be sufficiently detected because of the deposition of soft clad. The threshold S is to be determined by taking the above into account.

When max I(m) is smaller than the threshold S (the decision in the step 79F is NO), the "1" discrimination signal J is supplied to the input/output means 23B of the nuclear fuel handling unit control means 22 in order to detect the nuclear fuel identification number 74A by the ultrasonic probe 9 (step 79K). In the step 79F, the necessity of the detection of the nuclear fuel identification number 74A by the ultrasonic wave sensor, that is, the necessity of the movement of the ultrasonic wave probe 9 onto the fuel assembly 66 under consideration is checked. If the decision in the step 79F is YES, the characters of the character patterns $P_{jk}(l)$ are recognized as the characters corresponding to the standard character patterns $Q_{jk}(m)$ having the similarity max I(m) (step 79G). If the decision in the step 79H is NO, the steps 79C et seq are repeated. If the decision is YES, a step 79I (output of the "0" discrimination signal J) is carried out. The "0" discrimination signal J is also supplied to the input/output means 23B. Finally, the n characters (2FABC) recognized in the step 79J are supplied to the nuclear fuel number processing means 44 of the nuclear fuel identification code processing unit 43. The character recognition technique carried out by the nuclear fuel number identification/discrimination means 32 is a two-dimension template matching method.

The operation and process of the nuclear fuel identification code monitor 34 when the nuclear fuel number identification/discrimination means 32 produces the "1" discrimination signal J in the step 79K and the nuclear fuel monitor control means 25 produces the start of detection signal $S_2$ are now explained.

Figure 12:
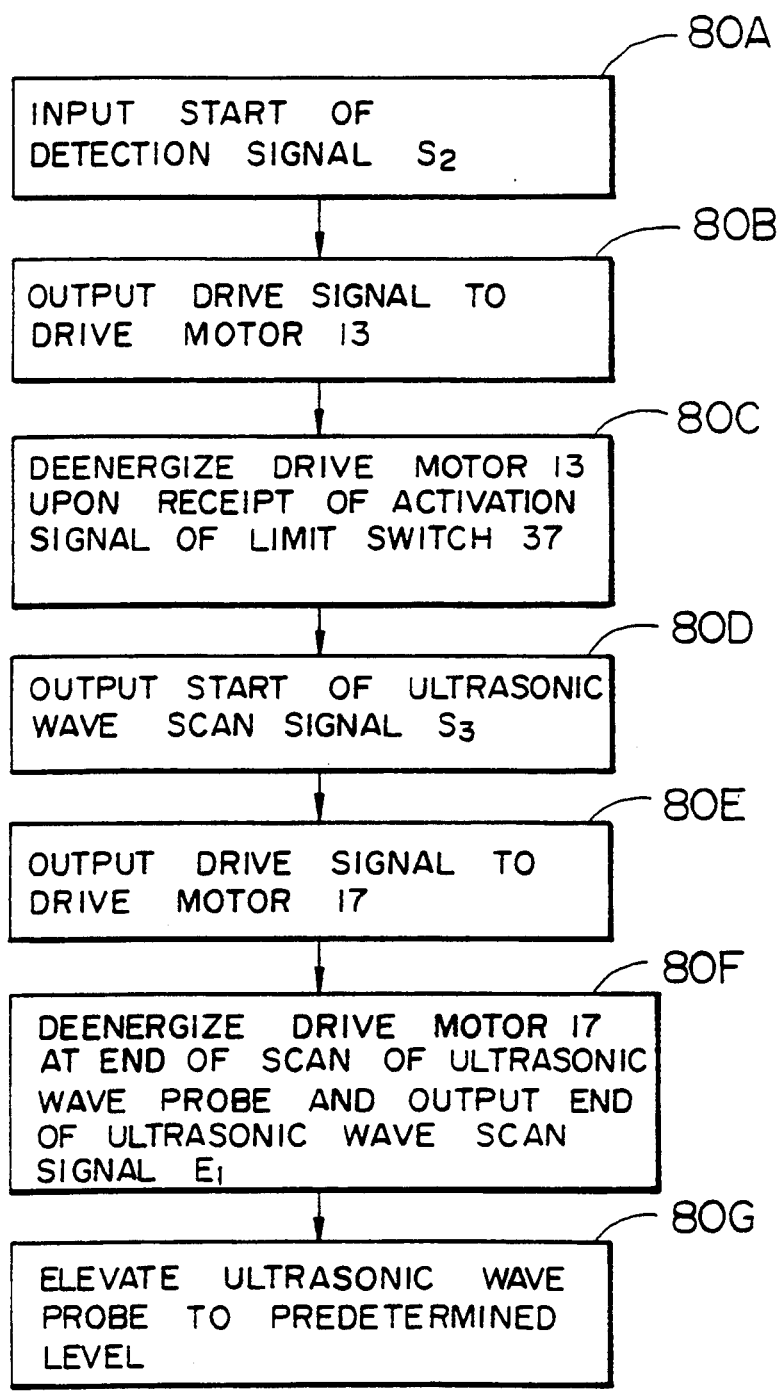
FIG. 12 shows a processing process of a probe scan mechanism control means.

The process of the probe scan control means 38 is shown in FIG. 12. When it receives the start of detection signal $S_2$ (step 80A) it sends a drive signal to the drive motor 13 (step 80B). As the drive motor 13 rotates, the rotary screw 14 is rotated and the box 12 which accommodates the ultrasonic wave probe 9 is moved down. When the start of detection signal $S_2$ is generated, the ultrasonic wave probe scanner 10 has already been located above the fuel assembly 66 under consideration. As a result, the handle 72 of the fuel assembly 66 is inserted between the pair of fixing guides 21 in the descending box 12. When the limit switch 37 contacts to the top 73 of the handle 72, it produces an activation signal. When the probe scanner control means 38 receives the activation signal, it stops the rotation of the drive motor 13. In a step 80D, a start of ultrasonic wave scan signal $S_3$ is generated. The start signal $S_3$ is supplied to the pulse generation means 35 and the ultrasonic signal processing means 40. When the pulse generation means 35 receives the start signal $S_3$, it produces an electrical pulse to cause the ultrasonic wave probe 9 to generate an ultrasonic wave. The ultrasonic wave generated by the ultrasonic wave probe 9 is irradiated to the top 73 of the handle 72. After the step 80D, a drive signal is supplied to the drive motor 17 (step 80E). As the drive motor 17 rotates, the rotary screw 18 is rotated and the probe support table 19 which accommodates the ultrasonic probe 9 is moved from the right to the left in FIG. 2. Since the fixing guides 21 contact to the top 73 of the handle 72, the ultrasonic wave probe 9 is moved laterally while the distance to the top 73 is kept constant. One of the pair of ultrasonic wave probe 9 mounted on the probe support table 19 moves on an extended line of an arrow $R_1$ (FIG. 5) and the other moves on an extended line of an arrow $R_2$ which is parallel to the arrow $R_1$. In the present embodiment, the pair of ultrasonic wave probes 9 can substantially simultaneously detect the two lines of recesses 75 of the nuclear fuel identification number 74A. When the ultrasonic wave probe 9 reaches the end point of scan, it is detected by the encoder 20. The detection signal (position signal of the ultrasonic wave probe 9) of the encoder 20 is supplied to the probe scanner control means 38. When the ultrasonic wave probe 9 reaches the end point of scan, the probe scanner control means 38 stops the drive motor 17 and produces an end of ultrasonic wave scan signal $E_1$ (step 80E). After the step 80F, it drives the drive motor 13 to elevate the ultrasonic wave probe 9 to a predetermined position (step 80G). Then, the detection of the nuclear fuel identification number 74A by the ultrasonic wave probe 9 is terminated.

Figure 13:
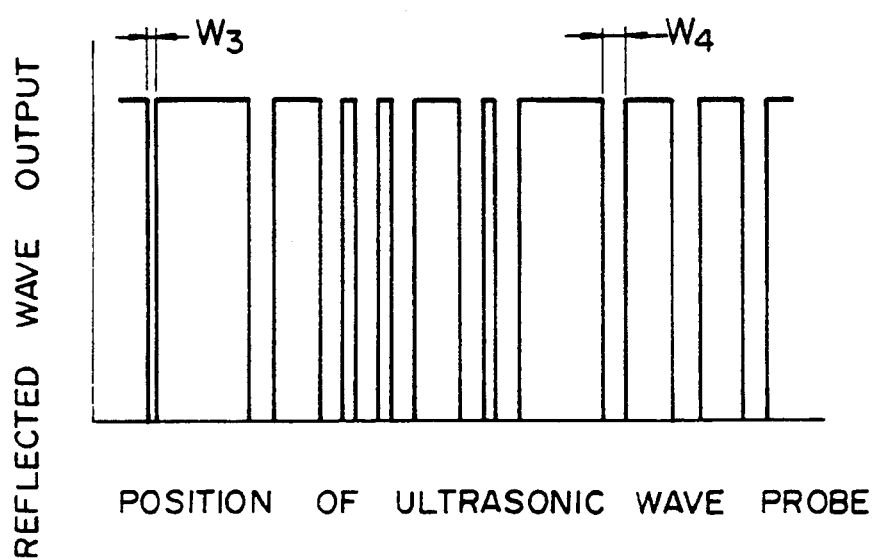
FIG. 13 shows a reflected wave received by an ultrasonic wave probe 9 of FIG. 2.

As described above, the ultrasonic wave probe 9 irradiates the ultrasonic wave to the top 73 of the handle 72 and receives the reflected ultrasonic wave from the top 73. A relationship between a horizontal position of the ultrasonic wave probe 9 driven by the drive motor 17 and the reflected ultrasonic wave is shown in FIG. 13. The reflected wave in FIG. 13 is detected by the ultrasonic probe 9 which is moved on the extended line of the arrow $R_1$. The ultrasonic wave generated by the ultrasonic wave probe 9 is mostly reflected by the area of the top 73 which has no recess 75, and the reflected ultrasonic wave is received by the ultrasonic wave probe. However, since the bottom of the recess 75 is arcuate as shown in FIG. 6, the ultrasonic wave is scattered in the area of recess 75 and little reflected wave reaches the ultrasonic wave probe 9. Accordingly, the amplitude of the reflected wave is zero in the area of recess 75. Clad may deposit on the top 73 of the handle 72 of the fuel assembly 66 which the fuel assembly 66 is loaded in the center of the nuclear reactor and a portion of the recesses 75 may be covered by the clad. Even if the recesses 75 on the top 73 of the handle 72 of the fuel assembly 66 loaded in the fuel rack 65 is covered by the clad, it is possible to detect the recesses 75 by the ultrasonic wave. This is due to the fact that there is no substantial difference between acoustic impedances of water and water-containing clad (primary constituent is ferric oxide). The reflected wave signal detected by the ultrasonic wave probe 9 is supplied to the signal receive means 36. In the reflected wave signal of FIG. 13, a zero reflected wave output area having a width $W_3$ corresponds to the recess 76 which is the read reference recess. Other zero reflected wave output areas correspond to the recesses 75.

As a method for detecting the digitized recesses 65 of the nuclear fuel identification number 74A, one of the following methods may be adopted: 1) two-dimensionally scanning one ultrasonic wave probe, 2) linearly scanning a plurality of parallelly arranged ultrasonic wave probes, and 3) two-dimensionally scanning the ultrasonic wave beam by electronically switching ultrasonic wave probes by using an array sensor having a plurality of ultrasonic wave probes arranged two-dimensionally to cover the entire area of the nuclear fuel identification number 74A. The present embodiment adopts the method 2).

Figure 14:
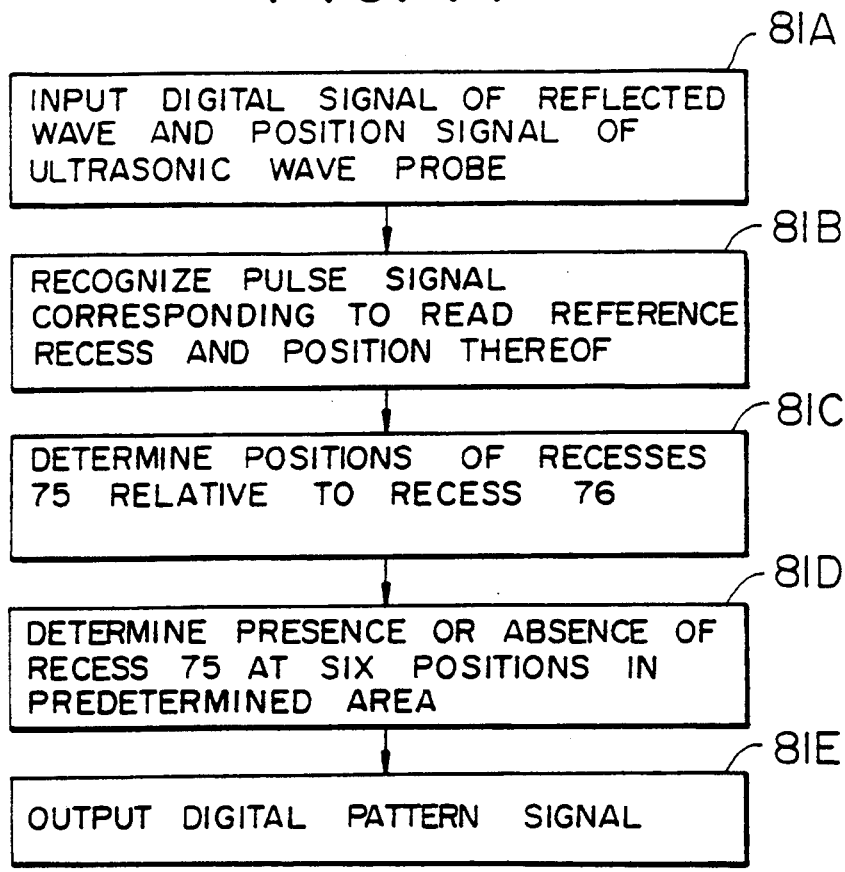
FIG. 14 shows a processing process of an ultrasonic wave signal processing means of FIG. 3.

The signal receive means 36 converts the input reflected wave signal to "1" and "0" pulse signals. The zero reflected wave output is converted to "1" and non-zero reflected wave output is converted to "0". The output signal (pulse signal) of the signal receive means 36 and the position signal of the ultrasonic wave probe 9 detected by the encoder 20 are supplied to the ultrasonic wave signal processing means 40, which carries out a process comprising steps 81A-81E shown in FIG. 14. The pulse signal corresponding to the read reference recess 76 detected, and the position of the ultrasonic wave probe 9 where the pulse signal was generated are determined based on the input signals supplied in the step 81A (step 81B). The pulse signal corresponding to the recess 76 can be readily detected because it is narrower (in the area of "1") than the pulse signals corresponding to the recesses 75. The presence or absence of the recesses 75 is detected and the positions of the recesses 75 are determined relative to the recess 76 (step 81C). The pulse signal corresponding to the recess 75, that is, the pulse signal having the pulse width $W_4$ is detected and the position of the ultrasonic wave probe 9 corresponding to the pulse signal of the pulse width $W_4$ is determined. Based on the data of the position of the recess 75 determined in the step 81C, the presence or absence of the recess 75 at six predetermined positions is determined in five areas sectioned by the broken lines 76 of the nuclear fuel identification number 74A of FIG. 5, and signals "0" or "1" are assigned to the six predetermined positions, with each predetermined position being a unit (step 81D). Thus, the digital pattern signals for the units, which are "1" if the recesses 75 are present and "0" if the recesses 75 are not present, are produced. A unit number of digital pattern signals corresponding to the number of characters ($n_2$) of the nuclear fuel identification number 74B are supplied to the fuel number recognition means 41 in sequence starting from the recess 76 (step 81E).

Figure 15:
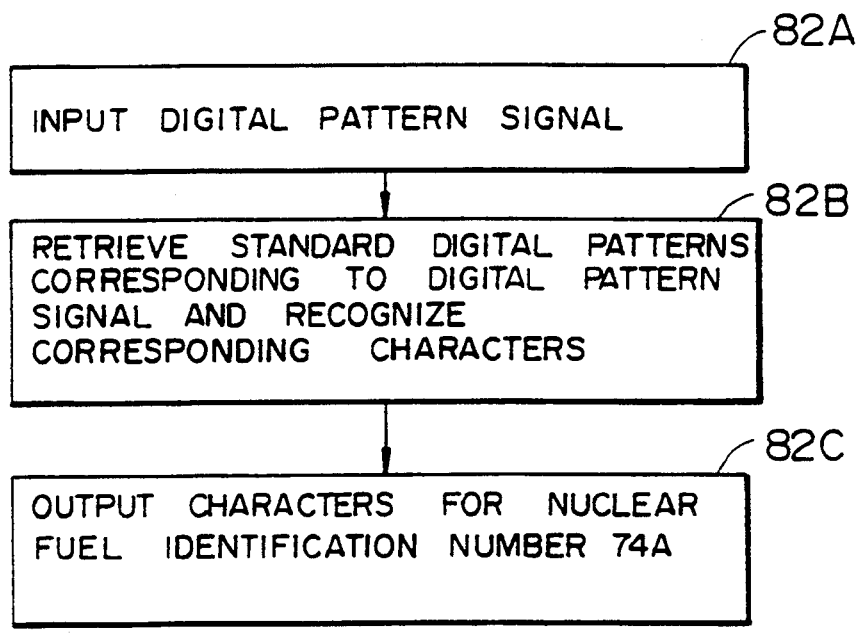
FIG. 15 shows a processing process of a fuel number identification means of FIG. 3, FIGS. 16, 22 and 32 show other embodiments of the nuclear fuel identification code reader of the present invention.

The fuel number recognition means 41 carries out a process comprising steps 82A-82C shown in FIG. 15. The memory 42 stores the correspondence between the standard digital patterns which represent the presence or absence of the recesses 75 shown in FIG. 7 and the characters (alphanumeric). The fuel number recognition means 41 reads the standard digital patterns corresponding to the digital patterns for the respective units received in the step 82A, from the memory 42, and recognizes the characters corresponding to the standard digital patterns as the characters for the digital pattern signals (step 82B). The fuel number recognition means 41 supplies the $n_2$ characters (2FABC) recognized for the fuel identification number 74A to the fuel number processing means 44 (step 82C).

Thus, the detection of the nuclear fuel identification number marked on the handle 72 of the fuel assembly 66 by the nuclear fuel identification code monitor 28 or 34, and the recognition of the detected nuclear fuel identification number as characters are terminated.

The fuel number processing means 44 receives the characters of the nuclear fuel identification number recognized by the nuclear fuel identification code monitor 28 or 34, and the X-Y ID coordinates of the positions $K_i$ based on the values X and Y inputted to the nuclear fuel monitor control means 25. The fuel number processing means 44 stores the recognized characters of the nuclear fuel identification number and the X-Y ID coordinates of the positions $K_i$ in an associated manner, and displays them on the display 46 and prints them out by the printer 47. Since the recognized characters of the nuclear fuel identification number and the X-Y ID coordinates are associated, the nuclear fuel identification number of the fuel assembly 66 loaded at the position $K_i$ of the fuel rack 65 in the fuel storage pool 63 can be readily determined.

In accordance with the nuclear fuel identification code reader of the present embodiment, the following advantages are offered.

Since the nuclear fuel identification number 74B marked by the letters is recognized by the optical sensor and the nuclear fuel identification code monitor 28, the fuel assembly 66 in the fuel storage pool can be identified in a short time. Even if it is difficult to recognize the letters of the nuclear fuel identification number 74B based on the video signal from the optical sensor (due to the deposition of the clad to the handle 72 of the fuel assembly 66 under consideration), it is possible to readily recognize the letters of the nuclear fuel identification number by the ultrasonic wave sensor and the nuclear fuel identification monitor 34. By the combined use of the detection of the primary nuclear fuel identification number by the optical sensor and the detection of the supplementary nuclear fuel identification number by the ultrasonic wave sensor, the nuclear fuel identification numbers marked on all fuel assemblies in the fuel storage pool 63 can be detected in a very short time with an accuracy of essentially 100% (99.99%). By preferentially using the detection by the optical sensor to the fuel assembly 66 and supplementarily using the detection by the ultrasonic wave sensor in case the letters of the nuclear fuel identification number 74B cannot be recognized based on the information derived from the optical sensor, the above advantages, particularly the reduction of the detection time, are remarkable. In the present embodiment, for those of the fuel assemblies 66 stored in the fuel storage pool 63 whose nuclear fuel identification number 74B cannot be recognized by the optical sensor, the detection of the nuclear fuel identification number 74A by the ultrasonic wave sensor is effected. The automatic reading of the nuclear fuel identification number may also be effected. In the present embodiment, since the ultrasonic wave sensor detects the digitized recesses 75 formed on the top 73 of the handle 72 of the fuel assembly 66, the processing time for recognizing the letters can be significantly reduced compared to that required in detecting the letters themselves by the ultrasonic sensor. In the present embodiment, the structure of the ultrasonic wave probe scanner and the structure of the associated nuclear fuel identification code monitor (especially a processing program) can be simplified compared to a case where the letters themselves are detected by the ultrasonic wave sensor. The provision of the read reference recess 76 on the top 73 of the handle 72 facilitates the recognition of the letters of the nuclear fuel identification number 74A based on the reflected ultrasonic wave.

Since both the digitized (coded) nuclear fuel identification number 74A and the nuclear fuel identification number 74B in letters are marked on the top 73 of the handle of the fuel assembly 66, the detection by the optical sensor and the detection by the ultrasonic wave sensor are facilitated. The provision of the nuclear fuel identification number 74B also permits visual recognition by a human.

Since the sensor handling unit 1 is provided in the nuclear fuel handling unit 51, a portion of the nuclear fuel handling unit 51 can be utilized as the nuclear fuel identification code reader and the entire construction can be very compact. In other words, the fuel assembly may be moved by the nuclear fuel identification code reader. In FIG. 1, separate movable truck and laterally movable truck such as grapple 54 for handling the fuel may be provided, although the construction may be complex. The nuclear fuel handling unit control means 24 may also be assembled in a separate computer.

The mounting of the ITV camera 5 and the ultrasonic wave probe scanner 10 on one grapple 4 significantly contributes to the simplification of the structure. Since the drive mechanism (the drive motor 13 and the rotary screw 14) for moving up and down the ultrasonic wave probe 9 is provided separately from the grapple 4, the positioning of the ultrasonic probe 9 above the fuel assembly is facilitated.

Since the nuclear fuel identification number 74A including the recesses 65 is marked on the top 73 of the fuel assembly 66, the processing time required for the character recognition based on the reflected ultrasonic wave is essentially same as the processing time required for the character recognition based on the detection of the nuclear fuel identification number 74B by the ITV camera 5. However, the detection of the nuclear fuel identification number 74B by the ITV camera 5 can be continuously effected while the movable truck 52 and the laterally movable truck 53 are driven, but the detection of the nuclear fuel identification number 74A by the ultrasonic sensor should repeat the start and stop of the movement of the movable truck 52 and the laterally movable truck 5 and the start and stop of the scan of the ultrasonic wave probe 9 for each fuel assembly 66. Accordingly, the time required to recognize the nuclear fuel identification numbers of all fuel assemblies is shorter when both the character recognition for the fuel identification number 74B based on the video signal from the optical sensor and the character recognition based on the reflected wave by the ultrasonic wave sensor are used than when the characters of the nuclear fuel identification number 74A are recognized by the ultrasonic wave sensor.

Figure 16:
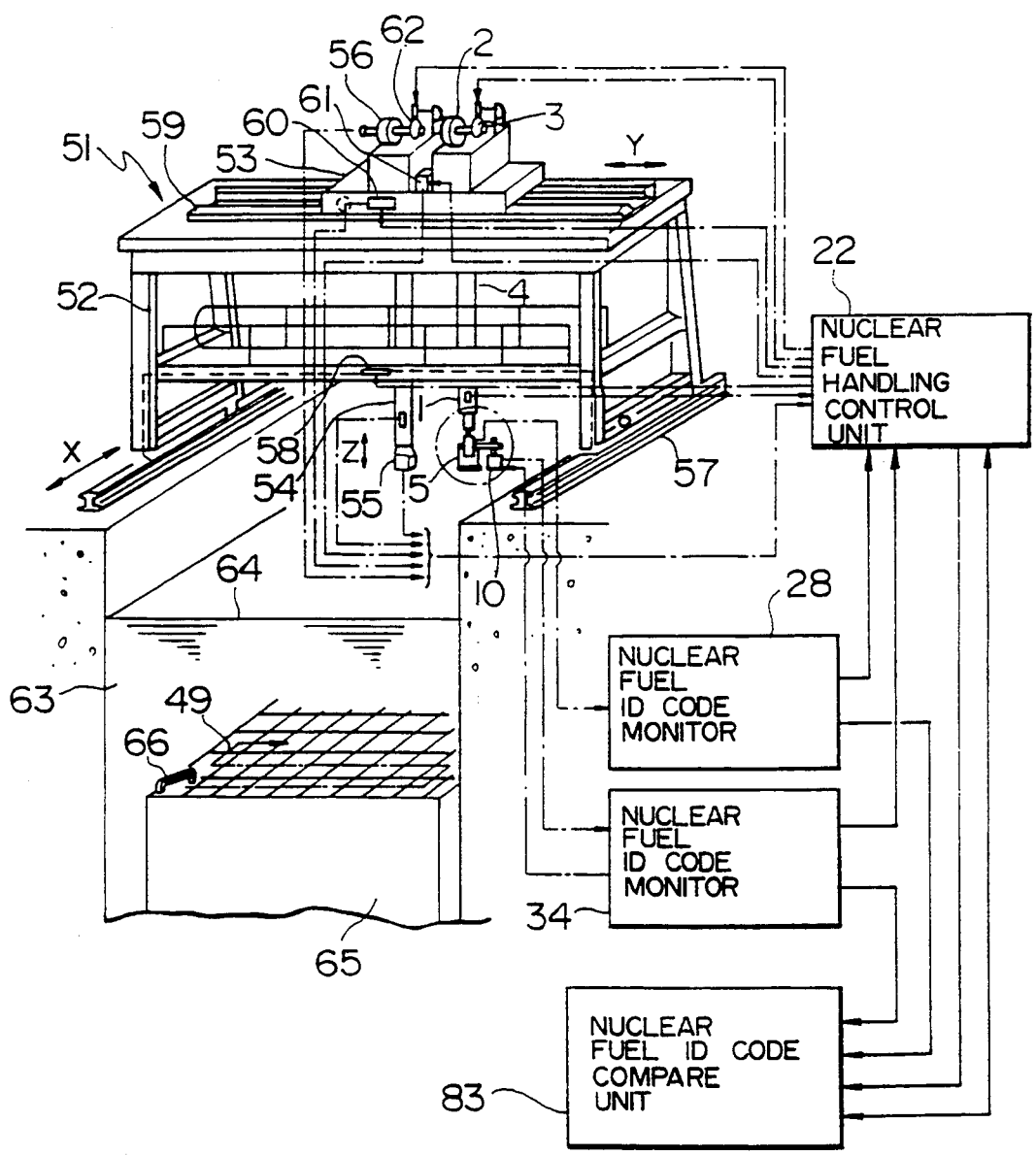
Figure 17:
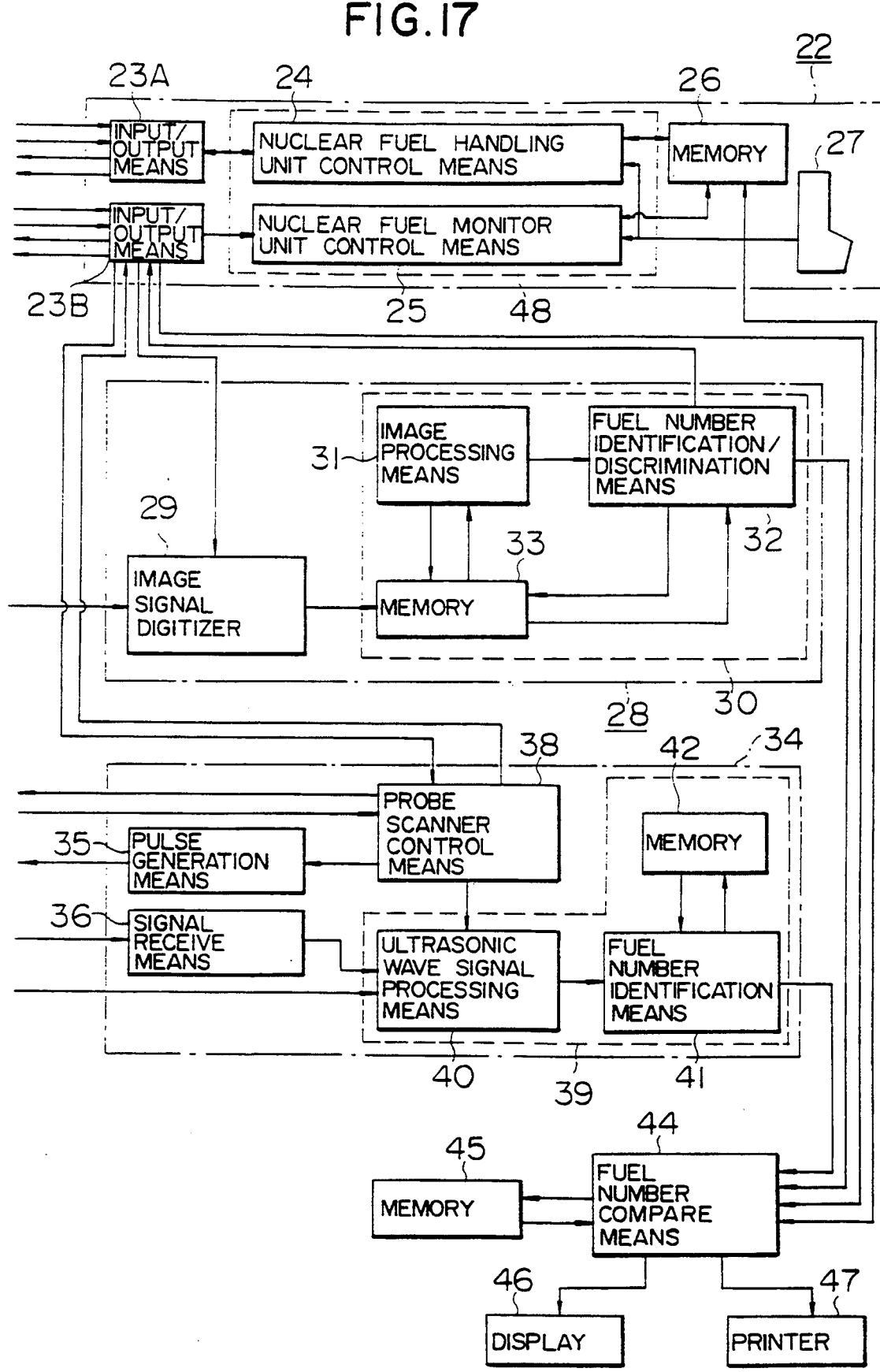
FIG. 17 shows a block diagram of a nuclear fuel handling control unit, a nuclear fuel identification code monitor and a nuclear fuel identification code illumination unit of FIG. 16.

Another embodiment of the nuclear fuel identification code reader of the present invention is explained with reference to FIGS. 16 and 17. The like elements to those shown in the embodiment of FIG. 1 are designated by the like numeral. Most elements of the present embodiment are identical to those of the embodiment of FIG. 1. In the present embodiment, the nuclear fuel identification code processing unit 43 in the embodiment of FIG. 1 is replaced by a nuclear fuel identification code compare unit 83. Configuration and operation of the nuclear fuel identification code compare unit 83 are explained below. The nuclear fuel identification code compare unit 83 has a memory 45 and fuel number compare means 84. The fuel number compare means 84 receives the letters of the nuclear fuel identification number recognized by the nuclear fuel identification code monitor 28 or 34, and also receives an X-Y ID coordinate of a position $K_i$ based on the values X and Y inputted to the nuclear fuel monitor control means 25 (step 85A). The memory 45 stores the nuclear fuel identification number (in letters) of the fuel assemblies 66 at each position $K_i$ of the fuel rack in the fuel storage pool 63. Those are previously detected data. The memory 45 also stores data representing the load status of the fuel assembly 66 fetched from the memory 26 by the fuel number compare means 84. This data indicates the presence or absence of the fuel assembly 66 at each position $K_i$ of the fuel rack 65.

The fuel number compare means 84 compares the X-Y ID coordinate of the position $K_i$ inputted currently and the letters of the nuclear fuel identification number for the position $K_i$ with the corresponding past data read from the memory 45 (step 85B), and determines the matching (step 85C). The comparison result is stored in the memory 45, displayed on the display 46 and printed out by the printer 47. If the result in the result in the step 85C is non-match, a buzzer is sound to alarm to the operator.

Figure 1:
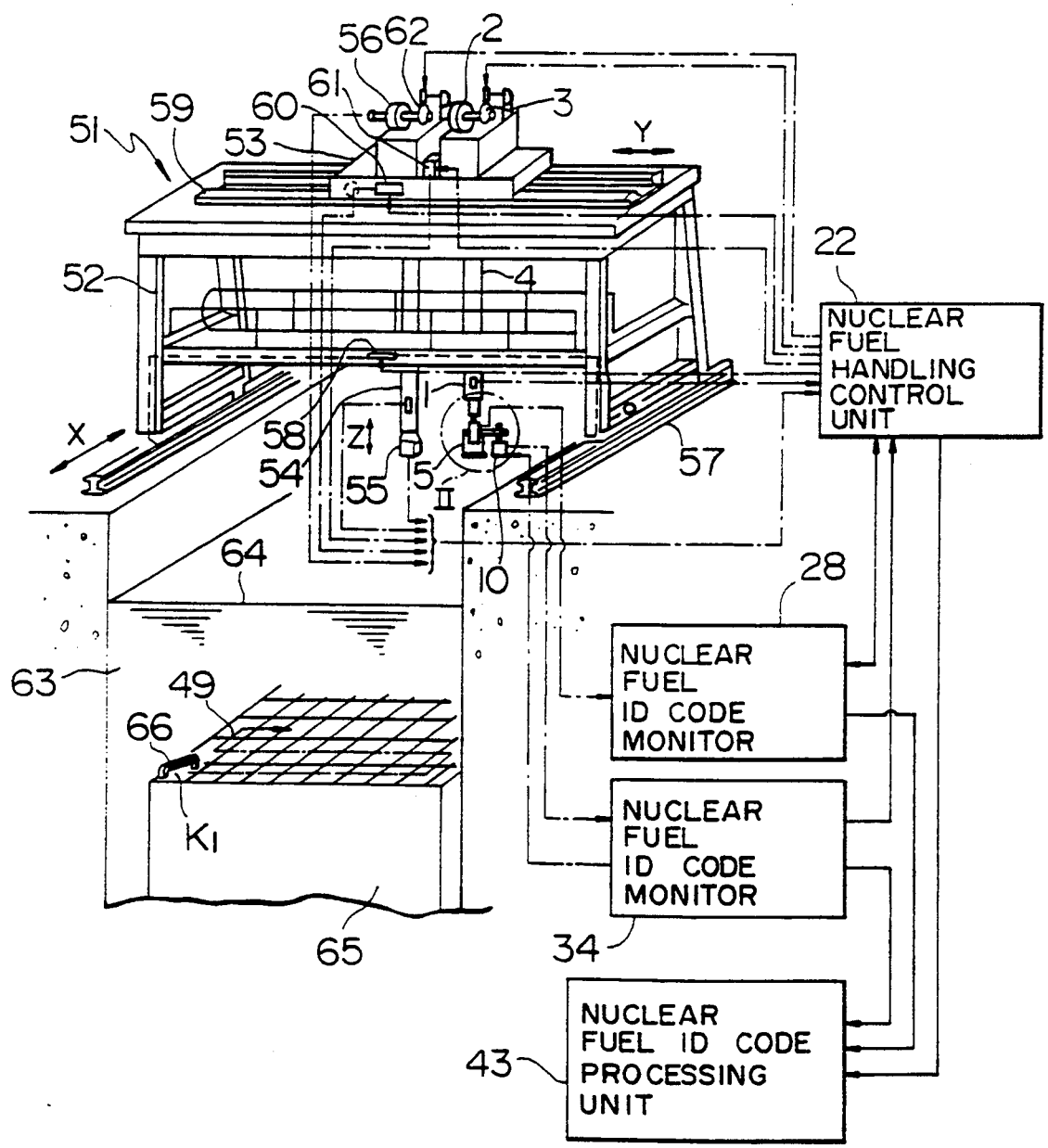
FIG. 1 shows one embodiment of a nuclear fuel identification code reader of the present invention.

In this manner, the present embodiment can attain the same advantages as those of the embodiment of FIG. 1, and it is particularly effective in the recognition of the fuel assembly 66 where the fuel assembly 66 is to be stored in the fuel storage pool 6 for an extended period. By the comparison of the letters of the current nuclear fuel identification number and the past data previously detected, the storage of the fuel assembly 66 having the identical nuclear identification number in the fuel storage pool 63 can be readily checked.

Figure 18:
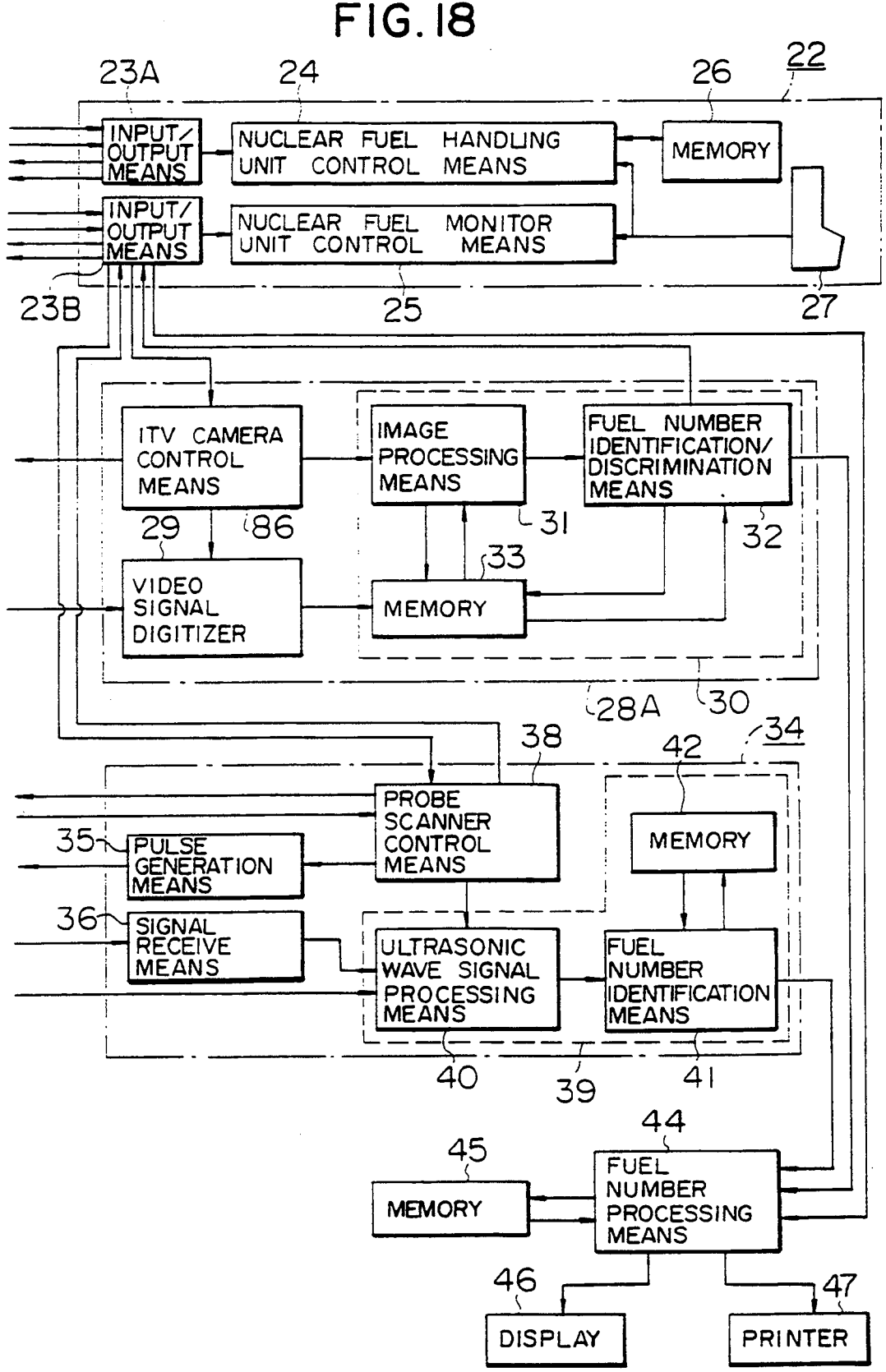
FIG. 18 shows a block diagram of another embodiment of FIG. 3.

Other embodiment of the nuclear fuel identification code reader of the present invention is explained below. As shown in FIG. 18, the present embodiment uses a nuclear fuel identification code monitor 28A in place of the nuclear fuel identification code monitor 28 of FIG. 1. The nuclear fuel identification code monitor 28A comprises, in addition to the elements of the nuclear fuel identification code monitor 28, ITV camera control means 86 which receives a start of detection signal $S_1$ from the nuclear fuel monitor control means 25. The ITV camera control means 86 generates a start of image pickup trigger signal to the ITV camera 5, a turn-on signal to the illumination unit 8, a start of input signal for the video signal to the video signal digitizer 29, and a start of image processing signal to the image processing means 31, in response to the input start of detection signal $S_1$. When the ITV camera 5, the illumination unit 8, the image signal digitizer 29 and the image processing means 31 receives those signals, they carry out the functions assigned thereto as they do in the embodiment of FIG. 1. The present embodiment also attains the same advantages as those of the embodiment of FIG. 1.

Figure 19:
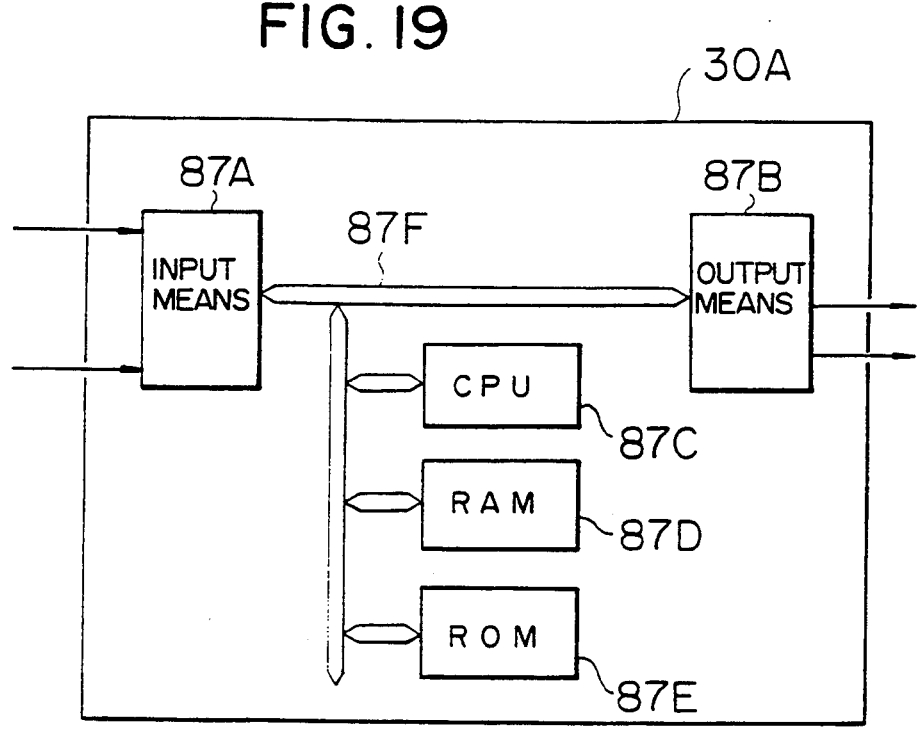
FIG. 19 shows another embodiment of a microprocessor of FIG. 3.

A software implemented embodiment of the image processing means 31 and the fuel number identification/discrimination means 32 of the microprocessor 30 used in the nuclear fuel identification code monitor 28 shown in FIG. 1 is explained with reference to FIG. 19. A microprocessor 30A which corresponds to the microprocessor 30 has input means 87A, output means 87B, a CPU 87C, a RAM 87D and a ROM 87E. The input means 87A is connected to the video signal digitizer 29 and the input output means 23B. The output means 87B is connected to the input/output means 23B and the fuel number processing means 44. An internal bus 87F connects the input means 87A, the output means 87B, the CPU 87C, the RAM 87D and the ROM 87E in the microprocessor 30A. The function of the memory 33 of the microprocessor 30 is effected by the RAM 87D. The output of the video signal digitizer 29 is stored in the RAM 87D. The ROM 87E stores the processing steps shown in FIGS. 9 and 10 with the steps 78F and 79A being removed and the step 79B being executed after the step 78E. In the present embodiment, the memory 33 of FIGS. 9 and 10 is replaced by the RAM 87D. The CPU 87C recognizes the letters of the nuclear fuel identification number 74B based on the video signal from the ITV camera 5 in accordance with the process stored in the ROM 87E.

Figure 20:
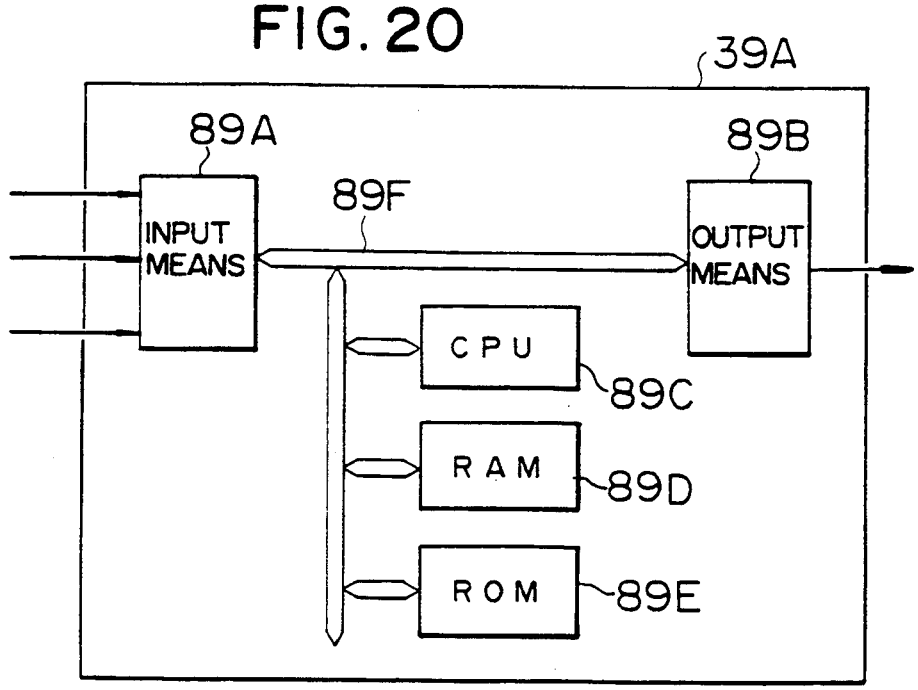
FIG. 20 shows another embodiment of the microprocessor of FIG. 3.

A software implemented embodiment of the ultrasonic signal processing means 40 and the fuel number identification means 41 of the microprocessor 39 used in the nuclear fuel identification code monitor 34 of FIG. 1 is explained with reference to FIG. 20. A microprocessor 39A corresponding to the microprocessor 39 has input means 89A, output means 89B, a CPU 89C, a RAM 87D and a ROM 89E which are interconnected through an internal bus 89F. The input means 89A is connected to the encoder 20 and the probe scanner control means 38. The output means 89B is connected to the fuel number processing means 44. The function of the memory 42 of the microprocessor 39 is effected by the RAM 87D. The processing steps shown in FIGS. 14 and 15 with the steps 81E and 82A being removed and the step 82B being executed after the step 81D are stored in ROM 87E. The CPU 87C recognizes the letters of the nuclear fuel identification number 74A based on the reflected ultrasonic wave in accordance with the process stored in the ROM 89E.

In the embodiment of FIG. 1, the same advantages are attained when the microprocessor 30 is replaced by the microprocessor 30A and the microprocessor 39 is replaced by the microprocessor 39A.

Figure 21:
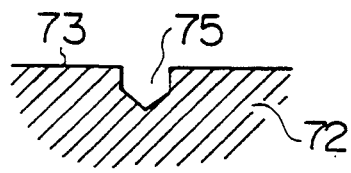
FIG. 21 shows another embodiment of a recess formed in a handle of the fuel assembly.

The recesses 75 of the nuclear fuel identification number 74A marked on the top 73 of the handle 72 of the fuel assembly 66 shown in FIG. 5 may be of an upside-down conical shape at the bottom as shown in FIG. 21. Preferably, the bottom of the recess 75 does not have a flat area which is parallel to the top 73. With such a shape, the scatter of the ultrasonic wave radiated to the recess 75 is violent and the reflected wave from the recess 75 back to the ultrasonic wave probe 9 is very little. As a result, the detection of the recess by the ultrasonic wave is facilitated.

The technical concept of the above embodiments may be utilized in recognizing the nuclear fuel identification number marked on a fuel assembly of a pressured water type nuclear reactor.

Other embodiment of the nuclear fuel identification code reader of the present invention is explained with reference to FIG. 22. Unlike the above embodiments, the nuclear fuel identification code reader of the present embodiment can be applied to a fuel assembly having no nuclear fuel identification code 74A marked on the top 73 of the handle 72. It can also recognize the nuclear fuel identification code 74B marked on the top 73 of the handle 72 by any one of the output signals of the optical sensor and the ultrasonic wave sensor.

The constructions of the nuclear fuel handling unit 51 and the sensor handling unit 1 of the present embodiment are identical to those of the embodiment of FIG. 1. In the present embodiment, the nuclear fuel handling control unit 22, the nuclear fuel identification code monitors 28 and 34, and the nuclear fuel identification code processing unit 43 in FIG. 1 are replaced by a nuclear fuel handling control unit 100, nuclear fuel identification code monitors 250 and 260 and a data processing unit 240, respectively.

The nuclear fuel handling control unit 100 has input/output means 23A and 23B, a nuclear fuel handling unit control means 24 and nuclear fuel detection unit control means 101. The input/output means 23A and 23B input and output signals similar to those for the nuclear fuel handling control unit 22 between the nuclear fuel handling unit 51 and the sensor handling unit 1. The nuclear fuel handling unit control means 24 and the nuclear fuel detection unit control means 101 are included in a computer 48A.

The nuclear fuel identification code monitor 250 comprises image processing means 140, a video signal digitizer 150, a video frame memory 160, fuel number identification/discrimination means 170 and illumination control means 180. The functions of the image processing means 140, the image frame memory 160 and the fuel number identification/discrimination means 170 are effected by a microprocessor 30A. The illumination control means 180 may also be constructed by the microprocessor. The video signal digitizer 150 has the same function as the video signal digitizer 29. The fuel number identification/discrimination means 170 is coupled to the input/output means. The nuclear fuel identification code monitor 250 reads the nuclear fuel identification code by the video signal produced by the ITV camera 5.

The nuclear fuel identification code monitor 260 comprises a signal processing microprocessor 39A, ultrasonic wave scanner control means 190 and ultrasonic wave transmit/receive means 200. The microprocessor 39A has the functions of the ultrasonic wave signal processing means 210 and the fuel number identification means 200A. The ultrasonic wave scanner control means 190 may also be constructed by the microprocessor. The ultrasonic wave transmit/receive means 200 comprises pulse generation means 35 and signal receive means 36. The pulse generation means 35 is connected to the ultrasonic wave probe 9 and the ultrasonic wave scanner control means 190. The signal receive means 36 is connected to the ultrasonic wave probe 9 and the ultrasonic wave signal processing means 210. The ultrasonic wave signal processing means 210 is coupled to the encoder 20 and the fuel number identification means 200. The ultrasonic wave scanner control means 190 is connected to the drive motors 13 and 17, the encoder 20 and the limit switch 37, and also to the input/output means 23B and the fuel number identification means 200A. The fuel number identification means 200 is coupled to the input/outptu means 23B and the fuel number identification means 170. The nuclear fuel identification code monitor 260 thus constructed recognizes the nuclear fuel identification code based on the reflected ultrasonic wave from the ultrasonic wave probe 9.

The data processing unit 100 comprises fuel number processing means 44, a memory 45 and overall control means 241. The fuel number control means 44 is connected to the display 46, the printer 47, the fuel number identification/discrimination means 170 and the fuel number identification means 200A. The overall control means 241 is connected to the input/output means 23A and 23B, the fuel number identification/discrimination means 170 and the fuel number identification means 200. The memory 45 is connected to the fuel number processing means 44 and the overall control means 241.

The console panel 270 is connected to the overall control means 241. The display 46 and the printer 47 may be arranged on the console panel 270.

The fuel assemblies 66A (BWR fuel assemblies) whose nuclear fuel identification numbers are to be read by the present embodiment are loaded in the fuel rack 65. The fuel assembly 66A is of the same structure as the fuel assembly 66. However, unlike the fuel assembly 60, the fuel assembly 66A has no nuclear fuel identification number 74A marked on the top 73 of the handle 72. The recess 76 and engraved nuclear fuel identification number 74B are marked on the top 73 of the fuel assembly 66A. The recess 76 has the same function as that in the embodiment of FIG. 1.

The operation of the nuclear fuel identification code reader of the present embodiment is now explained.

The operator designates the activation of one of the nuclear fuel handling operation and the nuclear fuel identification code detection unit through the console panel 270. The designated activation signal is supplied to the computer 48A. If the former activation signal is designated, the nuclear fuel handling unit control means 24 is activated, and if the latter activation signal is designated, the nuclear fuel detection unit control means 101 is activated.

It is assumed that the designated operation is the nuclear fuel handling operation. The nuclear fuel handling activation signal designated by the operator through the console panel 270 is supplied to the nuclear fuel handling unit control means 24 through the overall control means 241 and the input/output means 23A. Then, the nuclear fuel handling unit 51 is controlled by the nuclear fuel handling unit control means 24 as it is done in the embodiment of FIG. 1. Like the memory 26, the memory 45 stores the data relating to the load status of the fuel assembly 66A at each position in the fuel rack 65. The data in the memory 45 is updated when the load status of the fuel assembly 66A in the fuel rack 65 is changed by the movement of the used fuel assembly 66A by the nuclear fuel handling unit 51. The data is updated by the overall control means 241, which receives the related information from the nuclear fuel handling unit control means 24.

Figure 24:
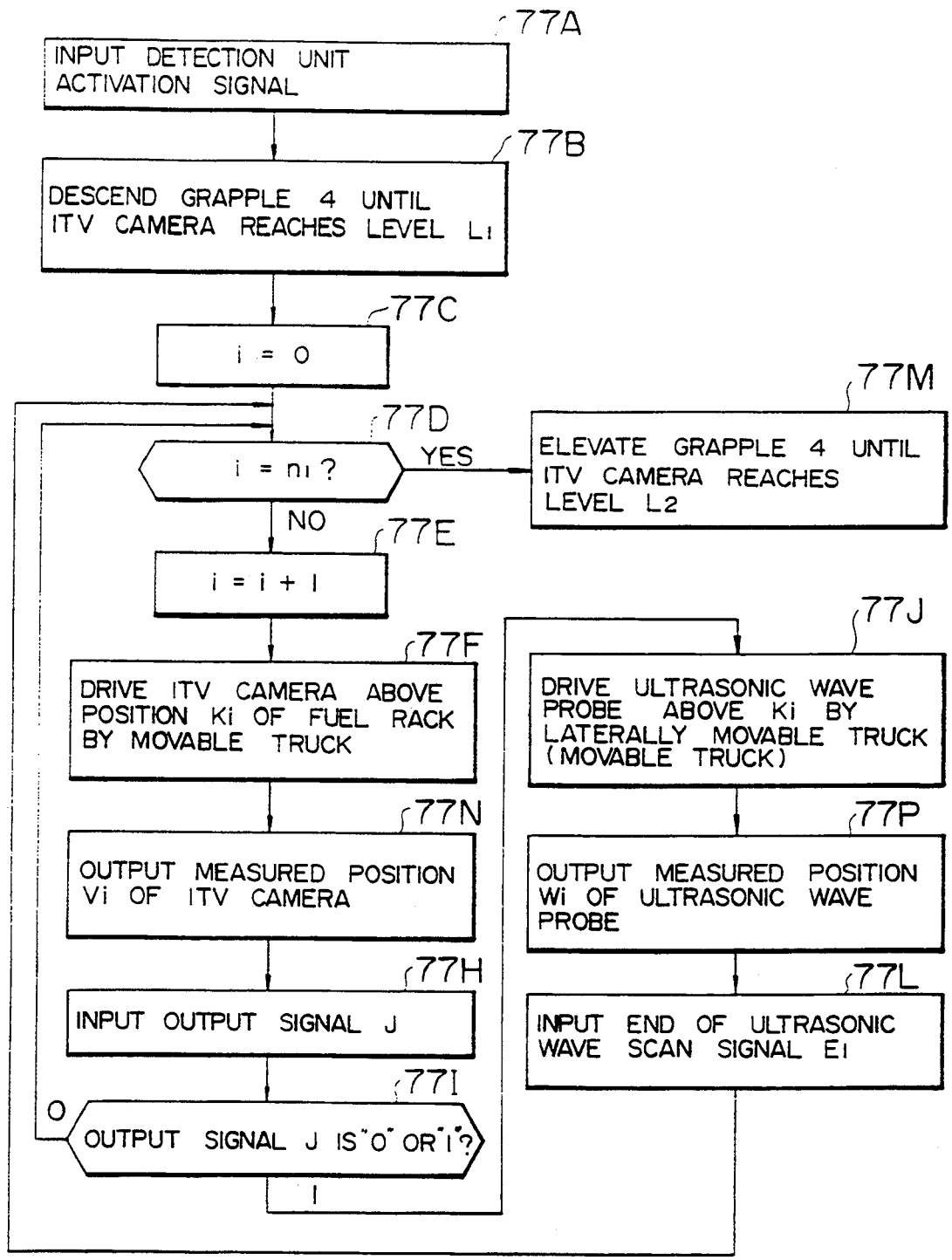
FIG. 24 shows a processing process of a nuclear fuel detector control means of FIG. 23.

When the activation of the detection unit is designated by the operator through the console panel 270, the overall control means 241 produces the detection unit activation signal. This signal is supplied to the nuclear fuel detection unit control means 101 through the input/output means 23B. The overall control means 241 reads the positions of the fuel assemblies 66A (positions $K_i$ on the chain line 49 starting at point $K_1$) whose nuclear fuel identification numbers are to be detected, from the memory 45 and sequentially supplies them to the input/output means 23B at a predetermined time interval. The nuclear fuel detection unit control means 101 receives those signals and controls the movement of the sensor handling unit 1 in accordance with a process shown in FIG. 24. The process shown in FIG. 24 is essentially identical to the process shown in FIG. 8. The process shown in FIG. 24 is different from the process shown in FIG. 8 in that a step 77N is executed after the step 77F, and a step 77P is executed after the step 77J.

The step 77N outputs the position $V_i$ of the ITV camera 5 determined based on the position signal representing the displacements X and Y measured by the synchronous signal generators. The step 77P outputs a position $W_i$ of the ultrasonic wave probe 9 determined based on the position signal representing the measured displacements X and Y. The position signal $W_i$ is produced when the fuel number identification means 170 produces a "1" output signal J (which is produced when all letters of the fuel identification number 74B are not recognized). Signals representing the positions $V_i$ and $W_i$ are produced by the input/output means 23B and supplied to the fuel number identification means 170 and the fuel number identification means 200A. Like the nuclear fuel monitor control means 25, the nuclear fuel detection unit control means 101 drives the ITV camera 5 which is the optical sensor for the nuclear fuel identification number onto the fuel assembly 66A under consideration, and drives the ultrasonic wave probe 9 which is the ultrasonic wave sensor onto the fuel assembly 66A for the detection of the fuel identification number 74B when it is difficult to recognize the fuel identification number 74B detected by the ITV camera 5.

Through the step 77F, the movable truck 52 and the laterally movable truck 53 are driven and the ITV camera 5 is first moved toward the position $K_1$. The fuel number identification means 170 receives the positions $V_i$ (X-Y ID coordinate) of the ITV camera 5 which are supplied from time to time by the input/output means 23B through the step 77M.

A portion of the process of the fuel number identification/discrimination means 170 is explained with reference to FIG. 27. The fuel number identification/deiscrimination means 170 inputs, in a step 79L, the predetermined position $K_i$ (initially $K_1$) supplied by the overall control means 241. In a step 79M, the position $V_i$ is inputted. The position $V_i$ is compared with the position $K_i$ (step 79N). If the decision in the step 79N is YES, it means that the ITV camera 5 is on the fuel assembly 66A which is at the predetermined position $K_i$. At this point, the fuel number identification/discrimination means 170 supplies the illumination unit turn-on signal to the illumination control means 180 although it is not shown in FIG. 27. The illumination control means 180 turns on the illumination unit 8 in response to this signal. The illumination unit turn-on signal is produced only when the initial position $V_1$ matches to the initial predetermined position $K_1$. Then, the illumination unit 8 is kept turned on until the reading of the nuclear fuel identification codes for a predetermined number of fuel assemblies 66A is completed. The fuel number identification/discrimination means 170 produces a start of A/D conversion signal through the step 79P substantially simultaneously with the output of the illumination unit turn-on signal. The video signal digitizer 150 starts the A/D conversion of the video signal for the top 73 of the handle 72 imaged by the ITV camera 5. The image signal converted to the digital signal by the video signal digitizer 29 is supplied to the image frame memory 160 in 1/30 second and stored in the image frame 160.

Figure 25:
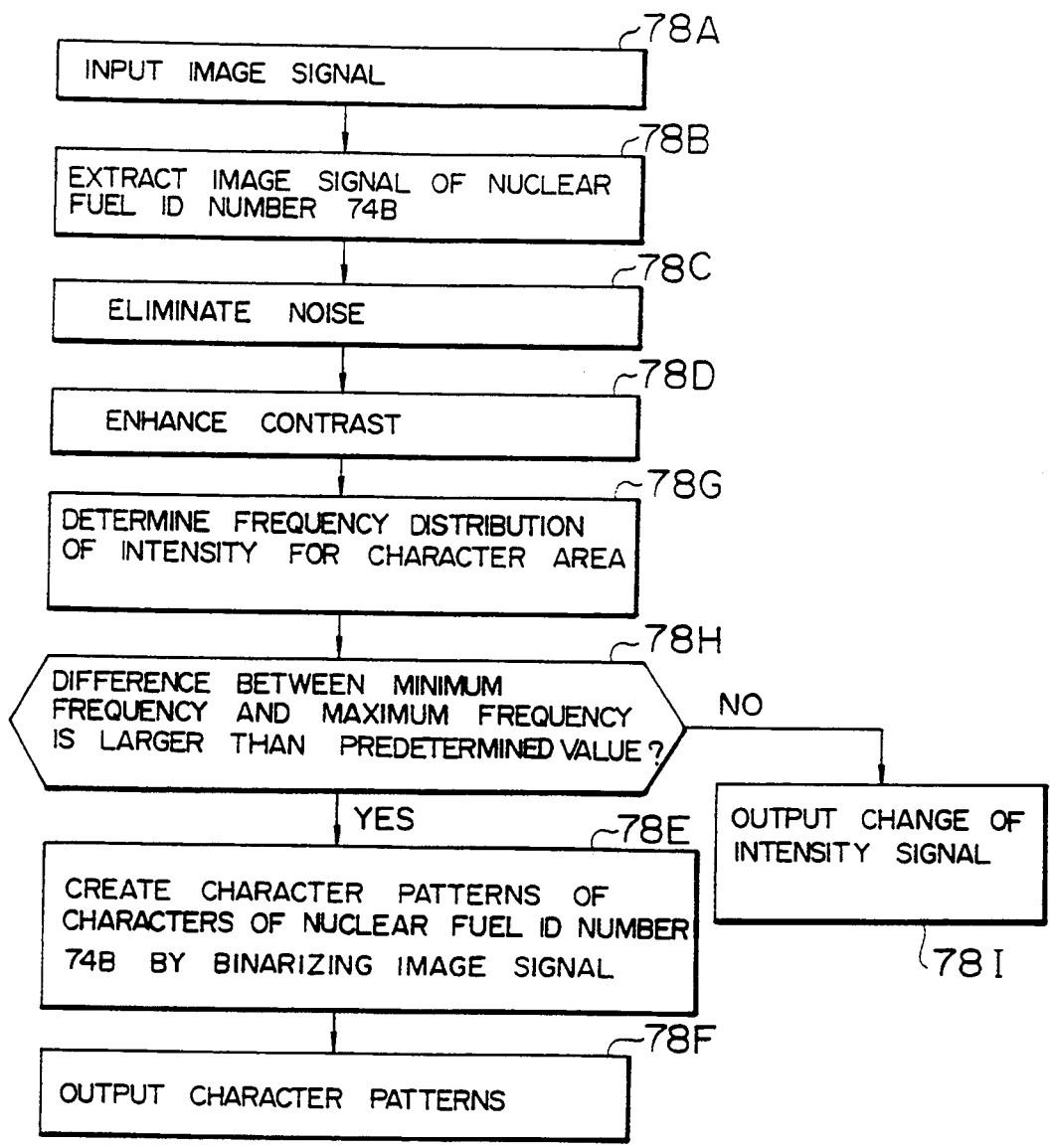
FIG. 25 shows a processing process of an image processing means of FIG. 23.
Figure 26:
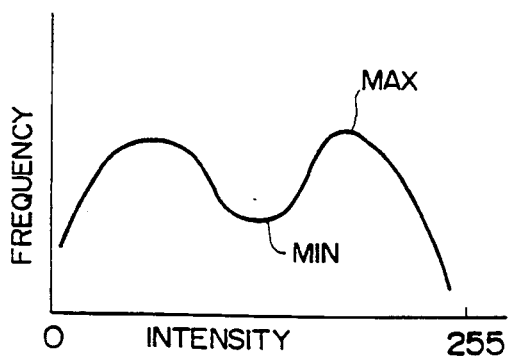
FIG. 26 shows a characteristic chart of a brightness rank and a frequency.

The image processing means 140 executes the process in accordance with the steps shown in FIG. 25. The process shown in FIG. 25 includes steps 78G–78I in addition to the steps shown in FIG. 9. After the steps 78A–78C, the step 78D is carried out. In the step 78D, one of intensity levels 0–255 is assigned to each of a number of pixels corresponding to one character (MXN pixels) in accordance with an image signal level of the corresponding portion. The rank 0 is darkest and the rank 255 is brightest. In the step 78G, a frequency distribution of the rank (FIG. 26) is determined in accordance with the intensity rank of each pixel. The frequency distribution is a distribution of number of pixels having the same intensity rank. A difference between a minimum frequency distribution and a maximum frequency distribution is compared with a predetermined value (step 78H). If the difference is not greater than the predetermined value, it means that the status in the binarization is not good, and a change of intensity signal is produced (step 78I). The illumination control means 180 receives the change of intensity signal to increase the intensity of the illumination unit 8. The time required for processing the above can be reduced to approximately 0.1 second by using a high speed illumination method such as a stroboscope illumination. After the intensity has been changed, the nuclear fuel identification number 74B is picked up by the ITV camera 5. If the decision in the step 78H is YES, the image signal is binarized in the step 78E to prepare the character pattern of the character. The binarization of the image signal is effected by selecting "1" for the signal which is larger than a predetermined reference between the minimum intensity rank and the maximum intensity rank of FIG. 26, and selecting "0" for the signal which is smaller than the predetermined reference. Then, the step 78F is carried out.

After the step 78F, the fuel number identification/discrimination means 170 sequentially carries out the steps 79A-79K shown in FIG. 10 as shown in FIG. 27. If the decision in the step 79F is NO, a "1" output signal J is produced in the step 79K as it is in the previous embodiment. The "1" output signal J means that the discrimination of the nuclear fuel identification number 74B by the ITV camera 5 is impossible due to the deposition of the soft clad. The "1" output signal J is also a signal to request redetection of the nuclear fuel identification number 74B by the ultrasonic wave probe 9.

When the fuel number identification/discrimination means 170 produces the "1" output signal J, the nuclear fuel detection unit control means 101 carries out the step 77J. The fuel number identification means 200 of the nuclear fuel identification code monitor 260 carries out the steps 76L-79P shown in FIG. 27. The predetermined position $K_i$ is inputted (step 79L). Then, the position $W_i$ of the ultrasonic wave probe 9 which varies from time to time and is produced by the nuclear fuel detection unit control means 101 in the step 77N is inputted. If the position $W_i$ matches to the predetermined position $K_i$, the start of detection signal $S_2$ is produced.

The ultrasonic wave scan unit control means 190 carries out the steps 80B-80G shown in FIG. 12 when it receives the start of detection signal $S_2$. The ultrasonic wave probe scan unit 10 is controlled by the signal which is derived through the steps 80B, 80C and 80E-80G.

Figure 29:
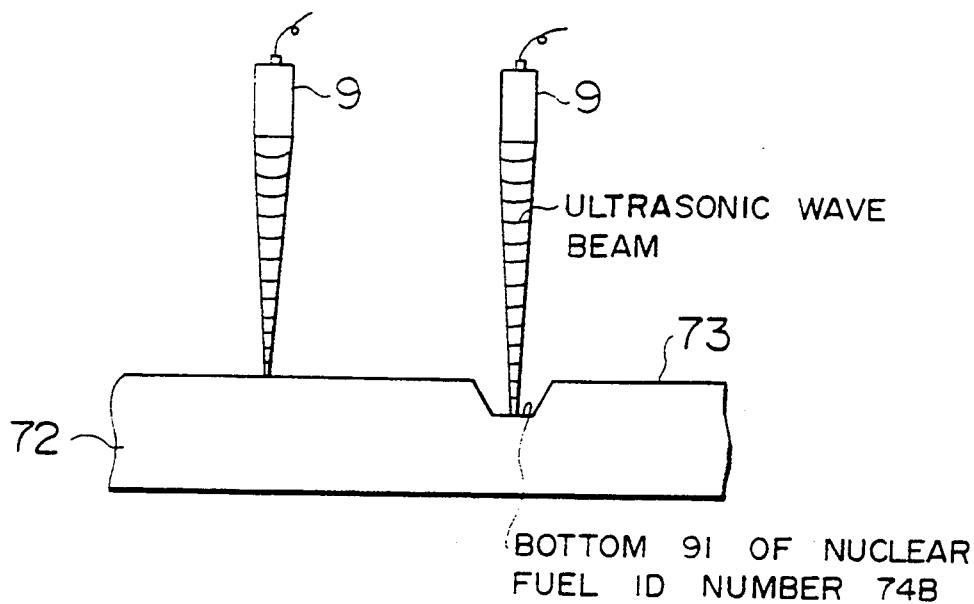
FIG. 29 shows a focused ultrasonic wave beam.
Figure 30:
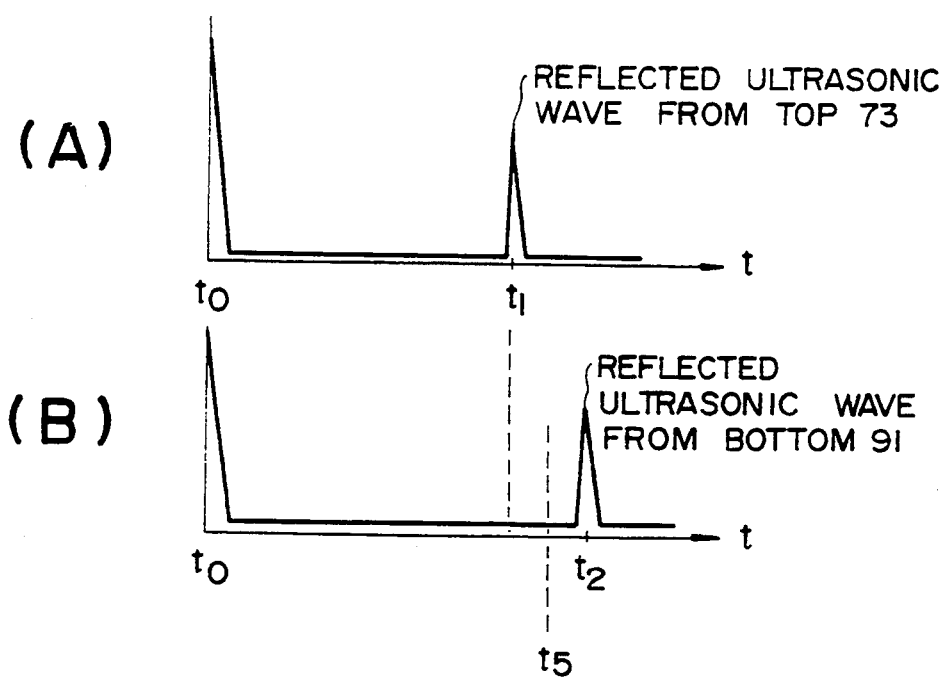
FIG. 30 illustrates a status of a reflected wave signal.
Figure 31:
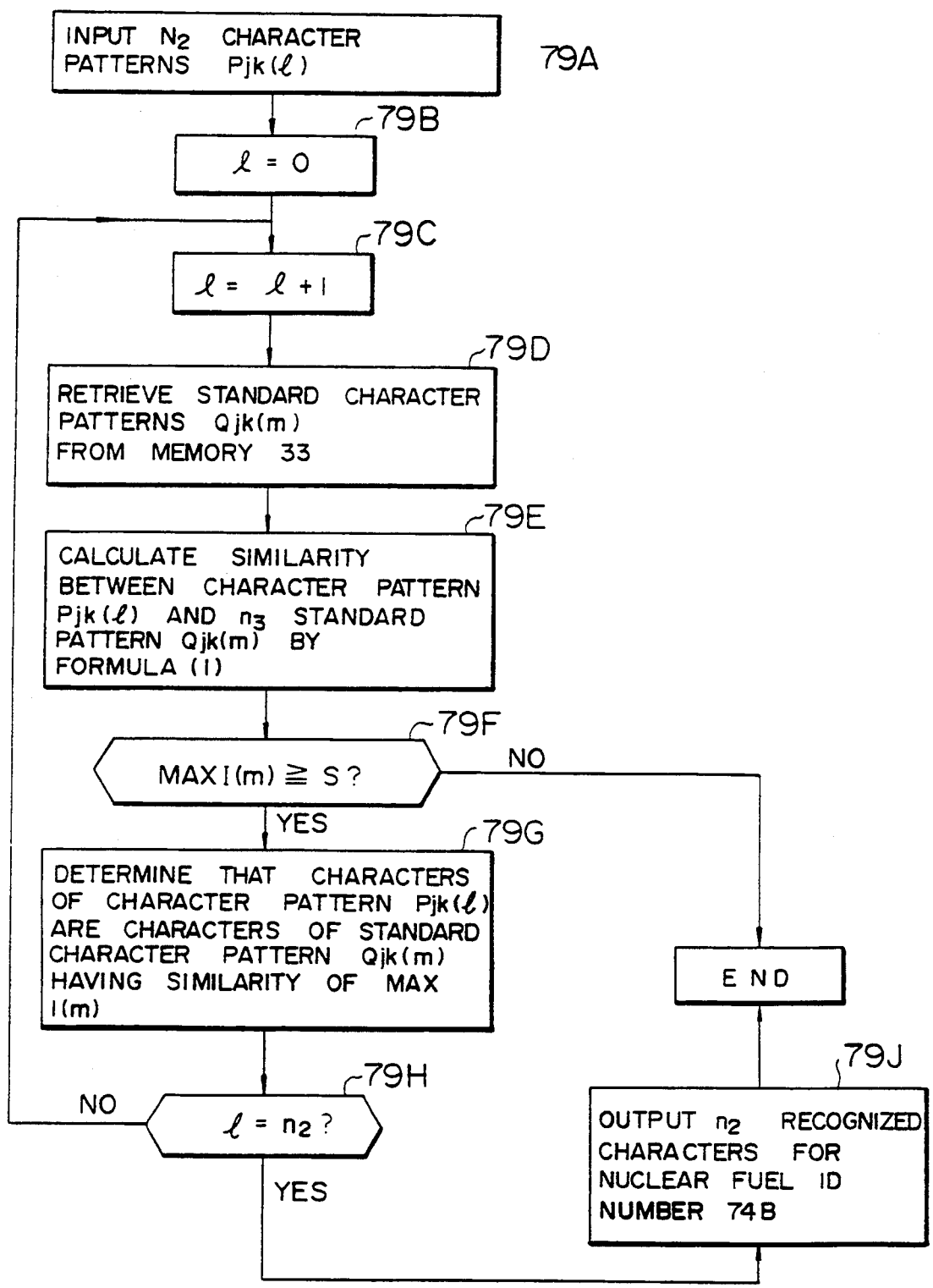
FIG. 31 shows a processing process of a fuel number identification means of FIG. 23.

The signal receive means 36 receives the reflected wave signal detected by the ultrasonic wave probe 9. The reflected wave is supplied to the ultrasonic wave signal processing means 210. The ultrasonic wave signal processing means 210 carries out the process shown in FIG. 28. In a step 81A, the reflected ultrasonic wave signal and the position signal of the ultrasonic wave probe 9 detected by the encoder 20 are inputted. The binarization of the reflected wave signal in a step 81F is effected based on a time difference between the reflected wave signals of the focused ultrasonic wave beam radiated from the ultrasonic wave probe 9. The focused ultrasonic wave beam from the ultrasonic wave probe 9 is radiated normally to the top 73 of the handle 72 and the bottom 91 of the nuclear fuel identification number 74B (FIG. 29). The time at which the reflected wave signal for the top 73 is represented by $t_1$ (FIG. 30A), and the time at which the reflected wave signal for the bottom 91 is received is represented by $t_2$ (FIG. 30B). A time to represent the time at which the focused ultrasonic wave beam is radiated. A time $t_s$ $(=(t_2-t_1)/2)$ is set as a threshold level. If the reflected ultrasonic wave signal is detected at a time $t$ where $t_s > t$, "0" is assigned to the position of the ultrasonic wave probe 9 at which the signal is detected. If the reflected ultrasonic wave signal is detected at a time $t$ where $t_s \leq t$, "1" is assigned to the position of the ultrasonic wave probe 9 at which the signal is detected. In this manner the reflected wave signal is binarized. In the present embodiment, the method 2) is used as it is in the previous embodiment. In the present embodiment, three or more ultrasonic wave probes 9 are arranged in parallel. In a step 81G, character patterns of the characters of the nuclear fuel identification number 74B are prepared in accordance with the position signal of the ultrasonic wave probe 9 and the binary signal produced in the step 81F. The prepared character patterns are supplied to the fuel number identification means 200 (step 81H). The fuel number identification means 200 carries out the steps shown in FIG. 31 which are essentially same as the steps shown in FIG. 10. If the decision in the step 79F is NO, the process is terminated.

The fuel number processing means 44 stores the characters of the nuclear fuel identification code 74B identified by the nuclear fuel identification monitor 250 or 260 and the corresponding X-Y ID coordinates of the positions $K_i$ in the memory 45. It also displays them on the display 46 and prints them out by the printer 47 as may be required.

The present embodiment also attains the same advantages as those of the embodiment of FIG. 1. However, since the nuclear fuel identification number 74B is detected by the ultrasonic wave probe 9 in the present embodiment, a longer recognition time is required than a case where the nuclear fuel identification number 74A is detected.

Other embodiment of the nuclear fuel identification code reader of the present invention is explained with reference to FIGS. 32 and 33. In the present embodiment, a Chelencoff light camera 93 and a nuclear fuel monitor 280 are added to the embodiment shown in FIG. 22. The Chelencoff light camera 93 is mounted on the mount table 6 (FIG. 2) of the sensor handling unit 1. The nuclear fuel monitor 280 has a video signal digitizer 110 and a signal processing microprocessor 94 as shown in FIG. 33. The microprocessor 94 has an image frame memory 120, nuclear fuel data processing means 130 and image processing means 140A. The video signal digitizer 110 is coupled to the Chelencoff light camera 93. The nuclear fuel data processing means 130 is coupled to the input/output means 23B, the fuel number processing means and the overall control means 241.

The present embodiment has means for determining if the used fuel assembly 66A stored in the fuel storage pool 63 is a real fuel assembly which contains the nuclear fuel. This means comprises the Chelencoff light camera 93 and the nuclear fuel monitor 280. The Chelencoff light camera 93 detects only a light in an ultraviolet range (Chelencoff light) emitted in water by a gamma ray emitted from a nuclear fission seed, amplifies it by a photo-multiplier and directs the amplified electrons to a phosphor plane to visualize them. The image picked up by the Chelencoff light camera 93 has a high intensity at an area corresponding to the water region surrounded by the fuel rods which contain the nuclear fuel.

Figure 34:
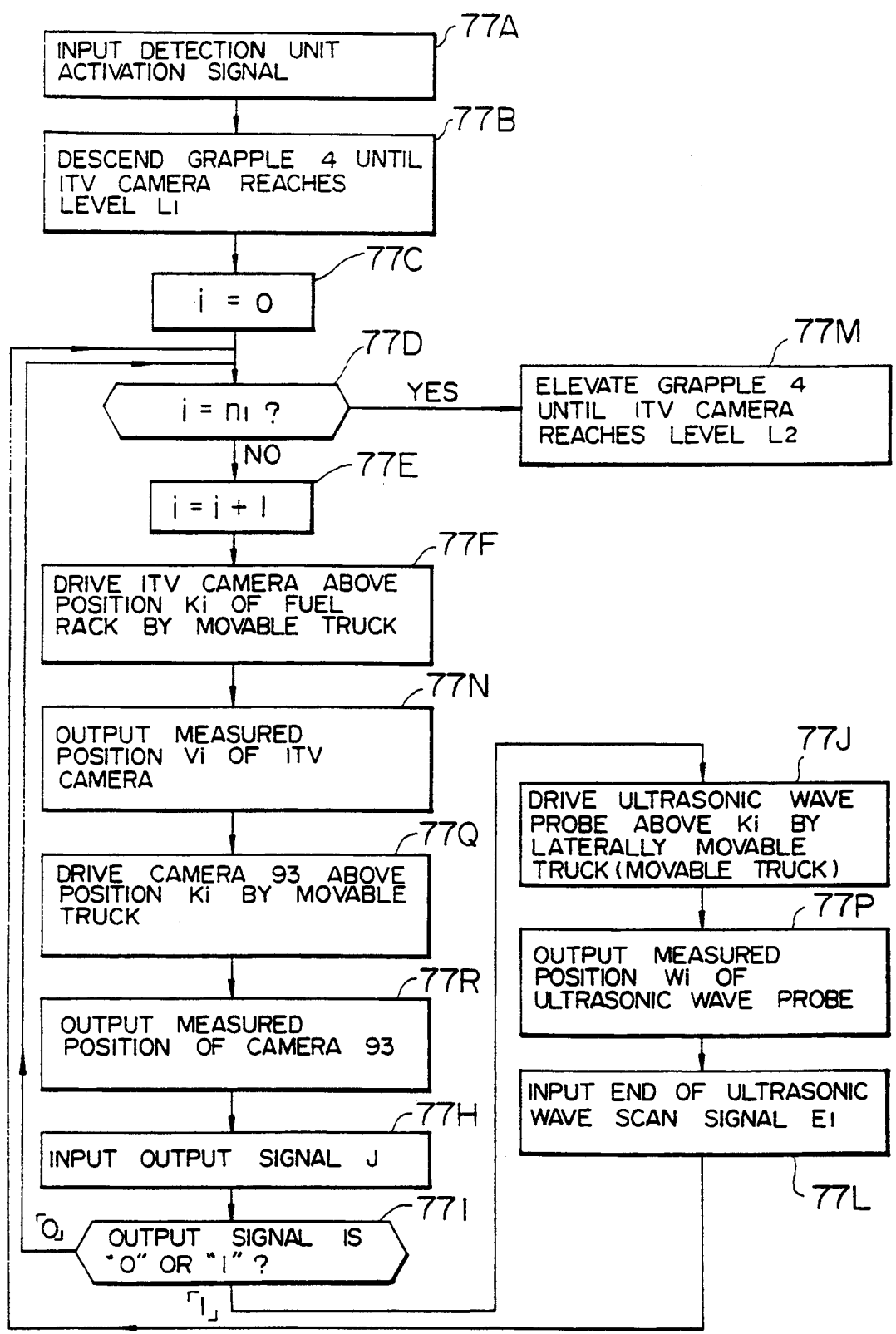
FIG. 34 shows a processing process of a nuclear fuel detector control means of FIG. 33.

The nuclear fuel detection unit control means 101A of the nuclear fuel handling control unit 100 controls the movement of the sensor handling unit 1 in accordance with a process shown in FIG. 34. In the process shown in FIG. 34, steps 77Q and 77R are added between the steps 77N and 77H of the process shown in FIG. 24. After the movement of the ITV camera 5 in the step 77F, the Chelencoff light camera 93 is moved to the position $K_i$ in the step 77Q. The position $U_i$ of the Chelencoff light camera 93 thus changes from time to time, and the position $U_i$ is outputted (step 77R).

The position $U_i$ outputted by the input/output means 23B is supplied to the nuclear fuel data processing means 130. The nuclear fuel data processing means 130 carries out the steps 79L–79P shown in FIG. 27 and supplies the start of A/D conversion signal to the video signal digitizer 110. The video signal digitizer 110 starts the A/D conversion of the video signal supplied from the Chelencoff light camera 93, in response to the start signal. The video signal converted to the digital signal is stored in the image frame memory 120 as the image signal.

Figure 35:
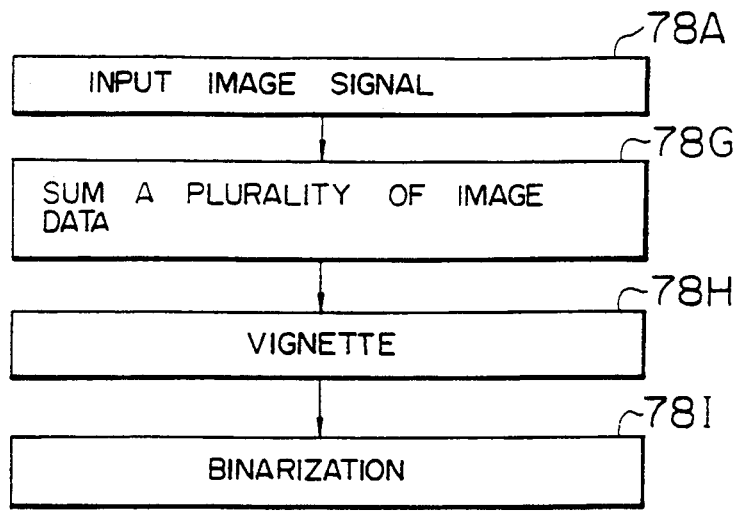
FIG. 35 shows a processing process of an image processing means of FIG. 33.
Figure 36:
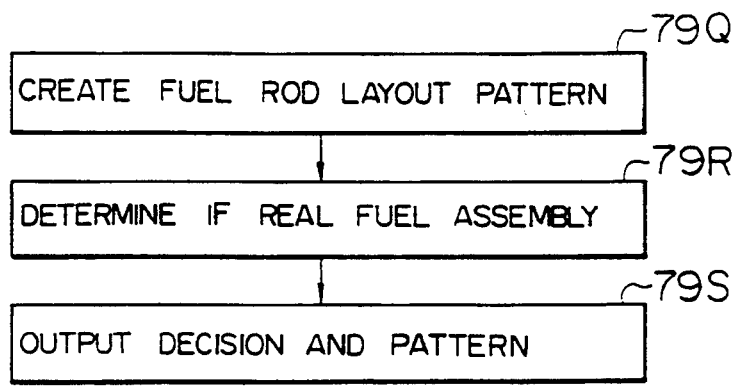
FIG. 36 shows a processing process of a nuclear fuel data processing means of FIG. 33.
Figure 37:
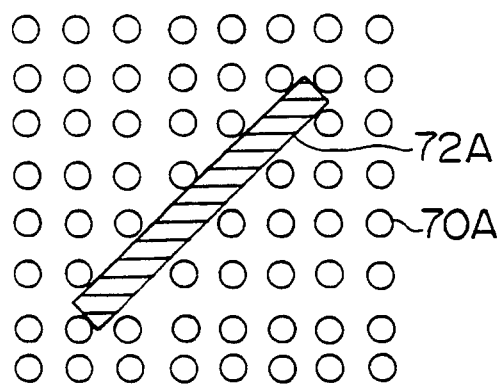
FIG. 37 shows a fuel rod layout pattern prepared in a step 79Q of FIG. 36.

The image picked up by the Chelencoff light camera 93 does not always have a high S/N ratio. When it is to be determined whether the nuclear fuel is contained in the fuel assembly 66A, no special image processing is required for the video signal picked up by the Chelencoff light camera 93. However, in order to determine whether the nuclear fuel is contained or not in the fuel assembly to prepare a Chelencoff light pattern, the following processing is required. This image processing is done by the image processing means 140A. FIG. 35 shows the image processing means. An image signal is supplied from the image frame memory 120 (step 78A). A plurality of frame images taken time-serially are combined for each pixel (step 78G). A noise component of the image signal is reduced by the combination and the S/N ratio of the image signal is enhanced. The image signal produced in the step 78G is vignetted (step 78H). Through this step, an RF noise component is eliminated from the image signal. The image signal having the RF noise component eliminated is binarized with a proper binarization level (step 78I). The binary data is supplied to the nuclear fuel data processing means 130. The Chelencoff light pattern is created based on the binary data (step 79Q). FIG. 37 shows the Chelencoff light pattern created in the step 78J. In FIG. 37, numeral 70A denotes a fuel rod and numeral 72A denote a handle. The fuel rods which contain the nuclear fuel are distinguished from other elements such as water rods which do not contain the nuclear fuel, and they are patterned. Based on the Chelencoff light pattern thus created, whether the fuel assembly 66A under consideration is the true fuel assembly which contains the nuclear fuel or not is determined (step 79R). The decision and the Chelencoff light pattern are supplied to the fuel number processing means (step 79S).

Figure 22:
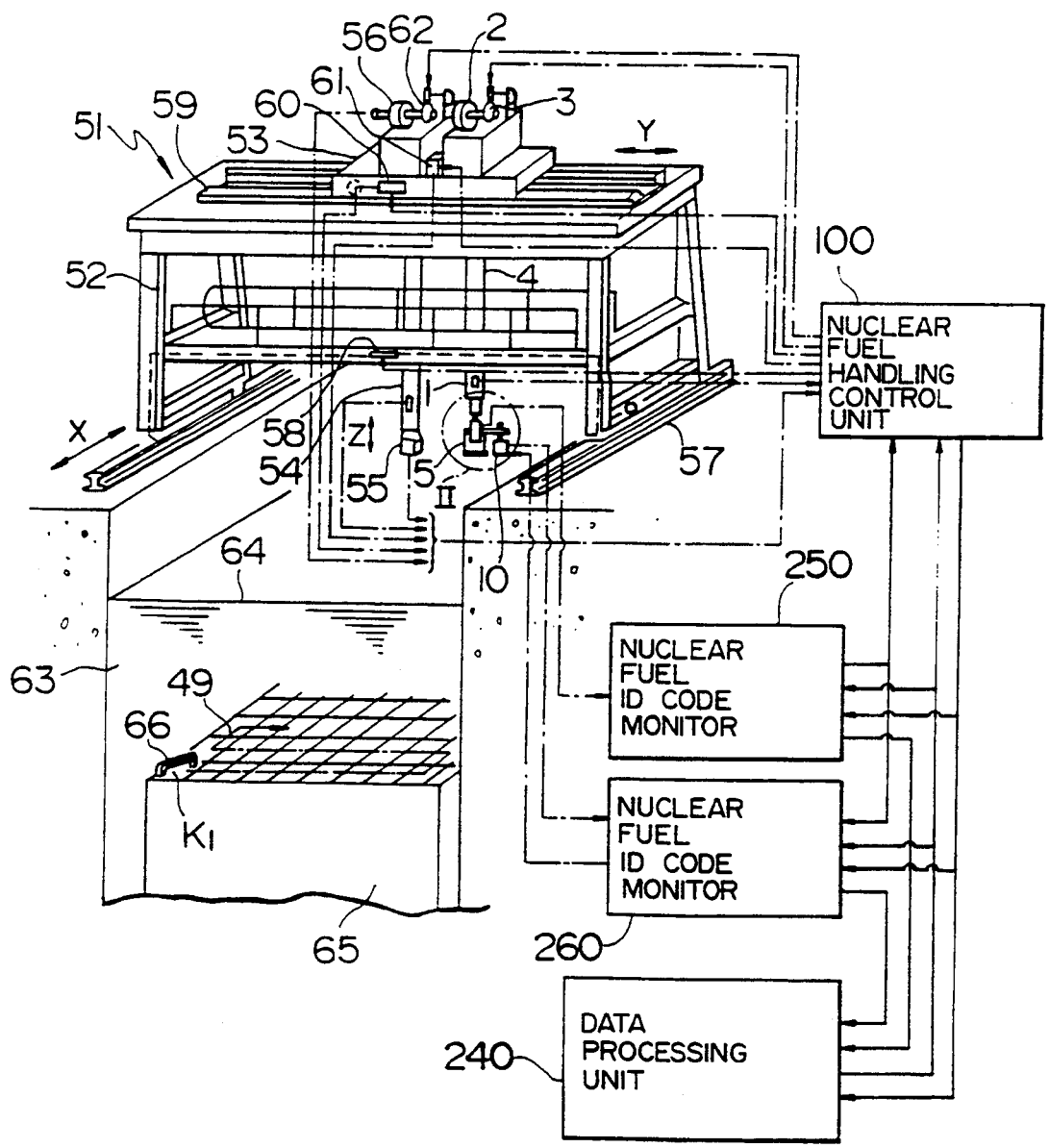
Figure 23:
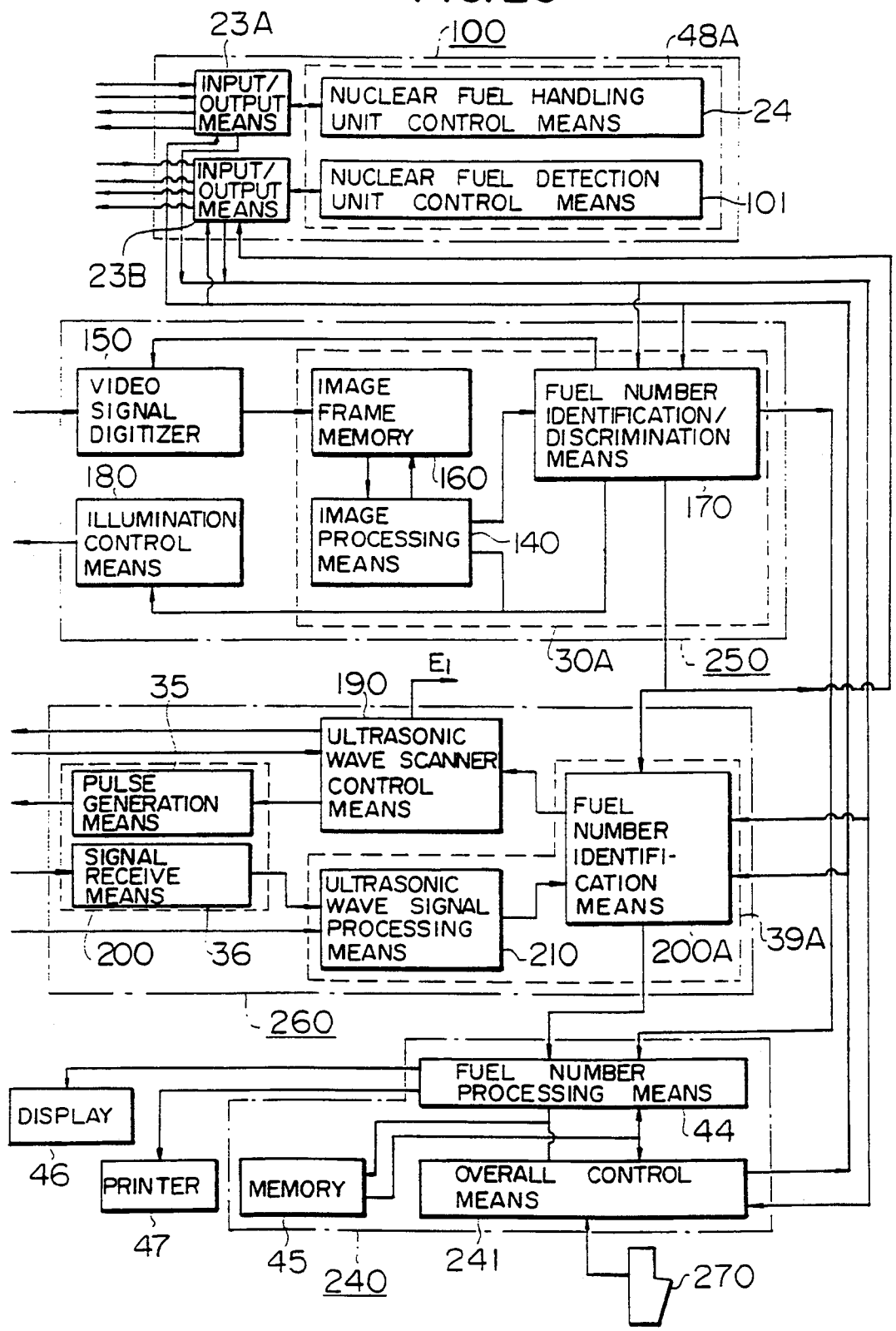
FIG. 23 shows a detailed block diagram of a nuclear fuel handling control unit, a nuclear fuel identification code monitor and a data processing unit of FIG. 22.

The fuel number processing means 44 carries out the same steps as those of the fuel number processing means 44 of the embodiment shown in FIG. 22, as well as the following steps. If the decision in the step 79R is "true fuel assembly", a reference Chelencoff light pattern corresponding to the nuclear fuel identification number 74B recognized by the nuclear fuel identification code monitor 260 or 280, and the Chelencoff light pattern created in the step 79Q are compared. Through the comparison, it is determined whether the recognized nuclear fuel identification number 74B is correct or not. The result of this determination and the decision in the step 79R are displayed on the display 46.

The present embodiment can attain the same advantages as those of the embodiment of FIG. 22. In the present embodiment, it is determined whether the fuel assembly 66A whose nuclear fuel identification number 74B is to be detected is true fuel assembly which contains the nuclear fuel or not. In the present embodiment, the correctness of the nuclear fuel identification number 74B recognized based on the Chelencoff light pattern can be checked and the accuracy of recognition of the nuclear fuel identification number is improved.

Figure 32:
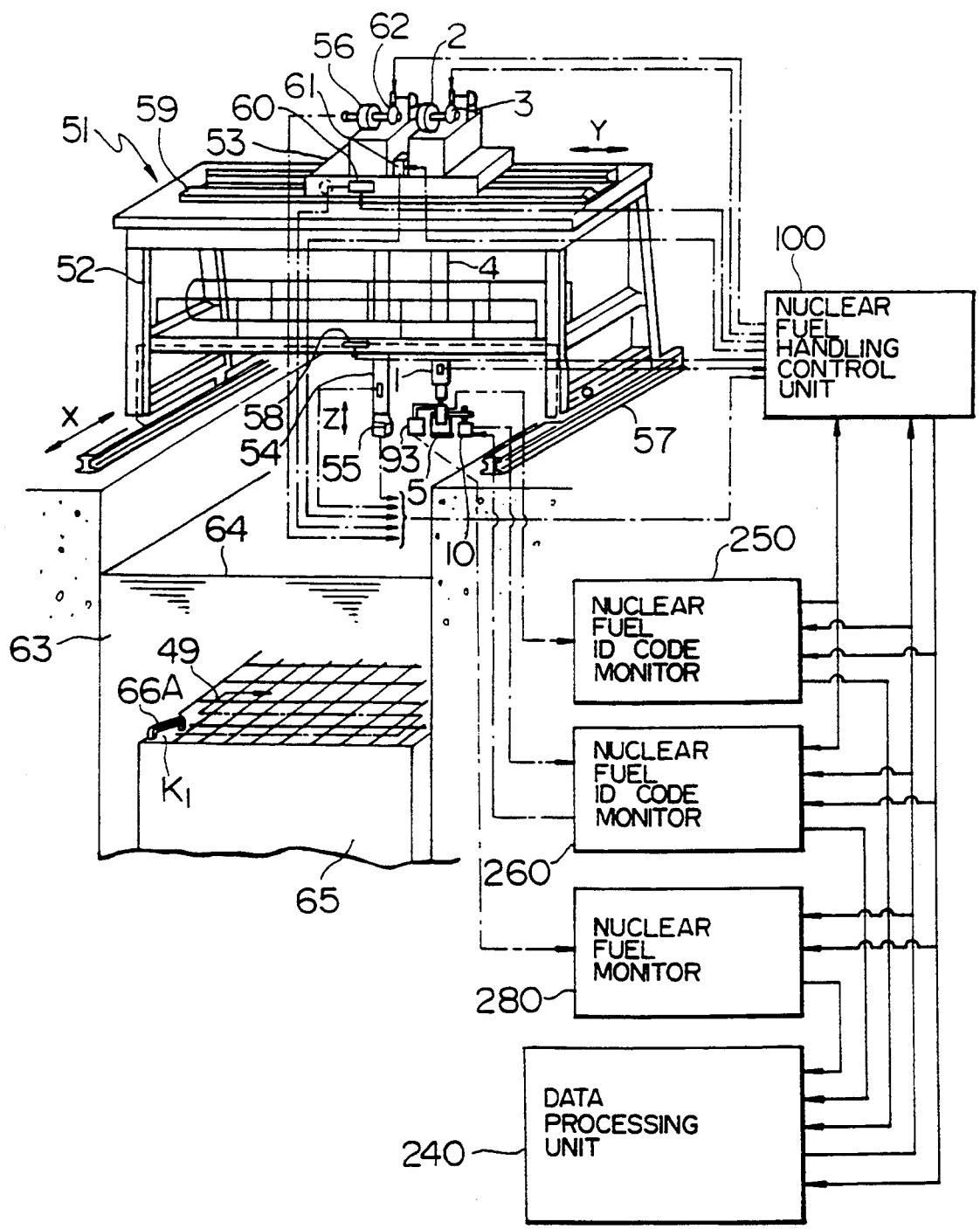
Figure 33:
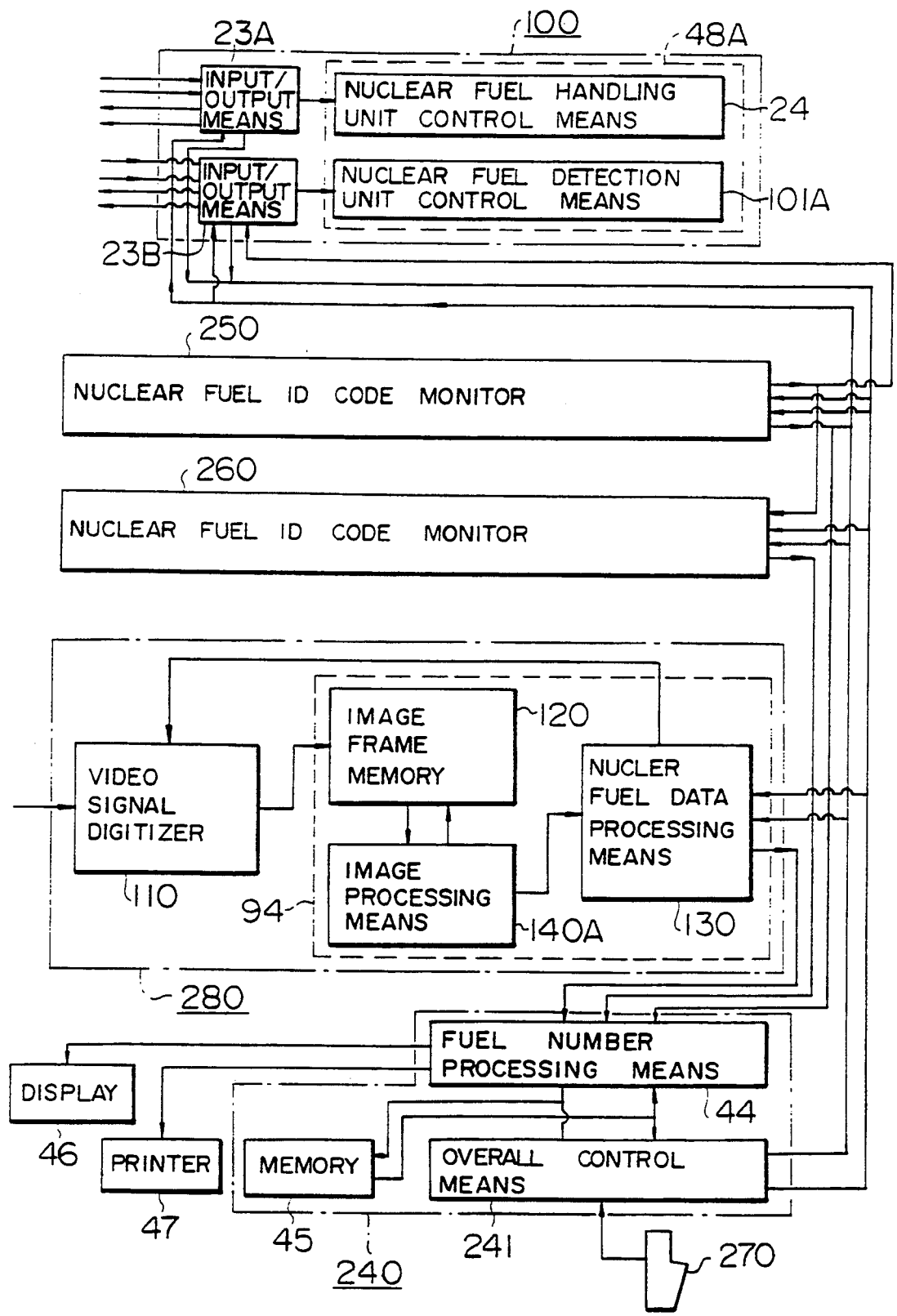
FIG. 33 shows a detailed block diagram of a nuclear fuel handling control unit, a nuclear fuel monitor and a data processing unit of FIG. 32.
Figure 38:
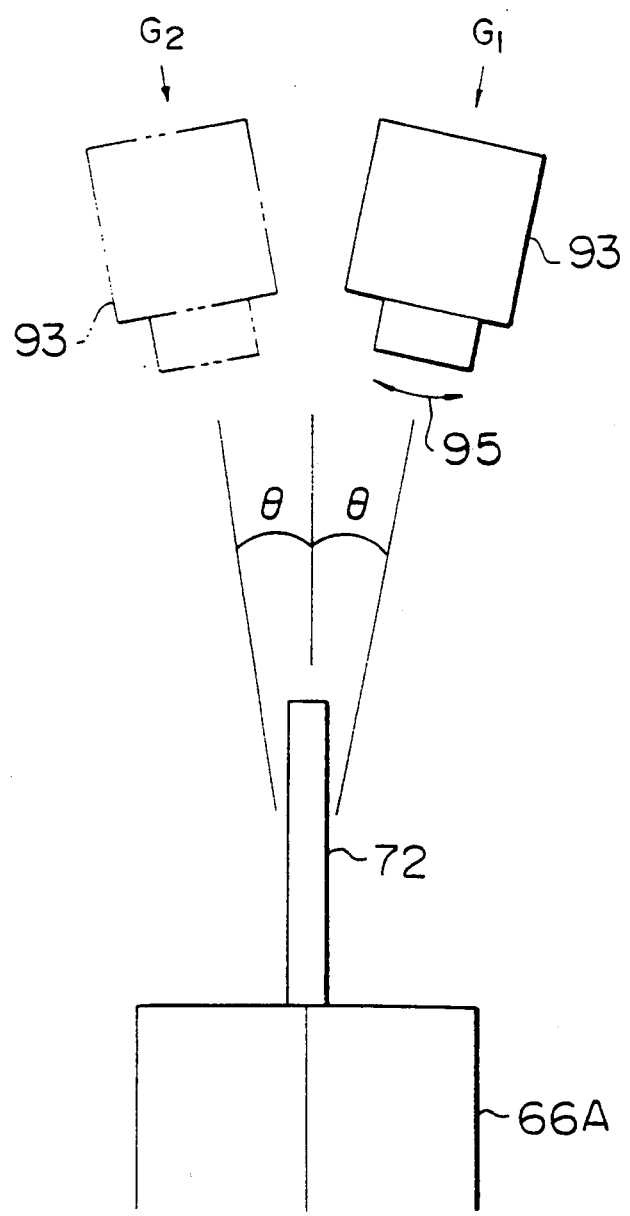
FIG. 38 shows a photographing status of a Chelencoff light photographing camera capable of producing a fuel rod layout pattern without generating an image of a handle.
Figure 39A:
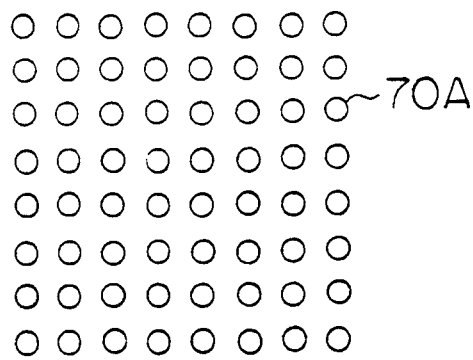
FIG. 39A shows a fuel rod layout pattern produced by the method of FIG. 38, FIGS. 39B and 39C show fuel rod layout patterns derived from video signals photographed in directions $G_1$ and $G_2$ in FIG. 38, and FIGS. 40A and 40B show other embodiments of an optical sensor of FIG. 2.
Figure 39B:
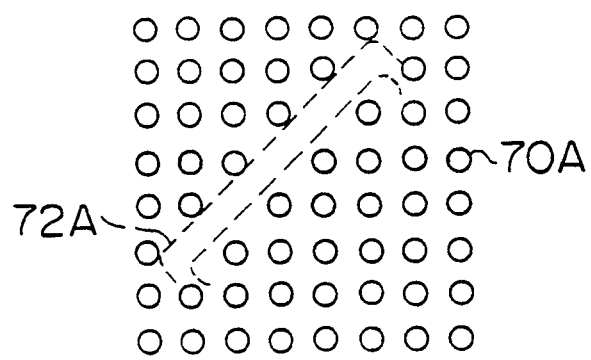
Figure 39C:
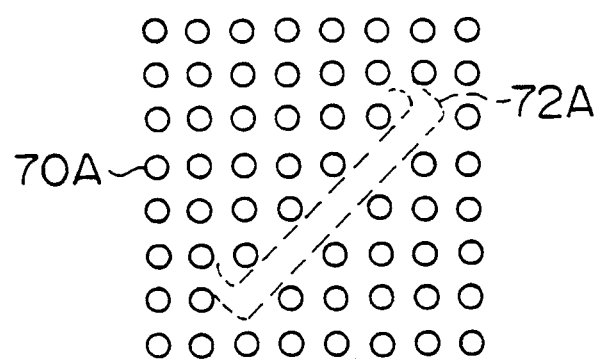

In the embodiment shown in FIG. 32, since the Chelencoff light camera 93 is driven directly above the handle 72 of the fuel assembly 66A under consideration, the image of the handle 72 is patterned as shown in FIG. 37. As a result, the pattern of the fuel rods located directly below the handle 72 is not created. This problem may be solved by inclining the Chelencoff light camera 93 around the handle 72 by an angle $\theta$ on each side and picking up the top of the fuel assembly 66A from two directions $G_1$ and $G_2$, as shown in FIG. 38. The Chelencoff light camera 93 may be rotated in a direction 95 by a motor (not shown) mounted on the mount table 6. The video signals picked up by the Chelencoff light camera 93 from the directions $G_1$ and $G_2$ are supplied to the nuclear fuel monitor 280. Those video signals are converted to digital signals by the video signal digitizer 110 and they are stored in the image frame memory 120. The image processing means 140A processes those image signals for the directions $G_1$ and $G_2$ to produce binary data. In a step 79Q of the nuclear fuel data processing means 130, the Chelencoff light patterns created based on the video signals picked up from the directions $G_1$ and $G_2$ are combined to create a new Chelencoff light pattern (FIG. 39A). The Chelencoff light pattern created based on the data of the direction $G_1$ is shown in FIG. 39B, and the Chelencoff light pattern created based on the data of the direction $G_2$ is shown in FIG. 39C. The Chelencoff light pattern of FIG. 39A is created by image combination of a triangular pattern at right bottom of FIG. 39B and a triangular pattern at left top of FIG. 39C. In the Chelencoff light pattern of FIG. 39A, the handle shown in FIG. 39B and 39C (in broken lines) disappears. Accordingly, the Chelencoff light pattern located directly below the handle is created.

The above embodiments are designed to read the nuclear fuel identification number marked on the BWR fuel assembly 66. The PWR fuel assembly 66B has the nuclear fuel identification number marked on the side of the top tie plate. A structure of an optical sensor which can read the nuclear fuel identification numbers marked on both types of fuel assemblies is shown in FIGS. 40A and 40B. FIG. 40A shows a read status for nuclear fuel identification number 74B marked on the fuel assembly 66. FIG. 40B shows a read status for the fuel assembly 66B. When this optical sensor is applied to the fuel assembly 66, a reflection mirror 96 supported by the ITV camera 5 is placed in parallel to the axis of the ITV camera 5. When it is applied to the fuel assembly 66B, the frame 7 and the illumination unit 8 are removed and a reflection mirror tube 97 is mounted on the mount table 6 instead, as shown in FIG. 40B. The reflection mirror tube 97 has a pair of reflection mirrors 99 at the top and the bottom thereof, and has an illumination unit 98 mounted at the lower end. The reflection mirror 96 is rotated to be obliquely to the axis of the ITV camera 5. The lower end of the reflection mirror tube 97 is inserted between the stored fuel assemblies 66B. The image of the nuclear fuel identification number 74B marked on the side at the upper end of the fuel assembly 66B is directed to the ITV camera 5 through the pair of reflection mirrors 99 and the reflection mirror 96.

The optical sensor shown in FIGS. 40A and 40B is applicable to the nuclear fuel identification code readers of the above embodiments.

What is claimed is:

1. A method for reading a nuclear fuel identification code marked on a fuel assembly, comprising the steps of:
   providing an optical sensor and an ultrasonic wave sensor;
   at least initially detecting the nuclear fuel identification code by the optical sensor;
   terminating recognition for the nuclear fuel identification code when the nuclear fuel identification code can be recognized based on information derived from the optical sensor as the reading of the nuclear fuel identification code;
   detecting the nuclear fuel identification code by the ultrasonic wave sensor when the nuclear fuel identification code can not be recognized based on the information derived from the optical sensor; and
   recognizing the nuclear fuel identification code based on the information derived from said ultrasonic wave sensor as the reading of the nuclear fuel identification code.

2. A method according to claim 1, wherein the nuclear fuel identification code marked on the fuel assembly is marked on an upper tie plate of the fuel assembly, the fuel assembly having a lower tie plate and a plurality of fuel rods with opposite ends thereof held by the upper tie plate and the lower tie plate.

3. A method according to claim 2, wherein the nuclear fuel identification code includes a first nuclear fuel identification code detectable by the optical sensor and a second nuclear fuel identification code detectable by the ultrasonic wave sensor, the first and second nuclear fuel identification codes being marked adjacent to each other on the upper tie plate.

4. A method for reading a nuclear fuel identification code, comprising the steps of:
   providing an optical sensor and an ultrasonic wave sensor;
   at least initially detecting a first nuclear fuel identification code marked on a fuel assembly by the optical sensor;
   terminating recognition for the first nuclear fuel identification code when the first nuclear fuel identification code can be recognized based on information derived from the optical sensor as the reading of the first nuclear fuel identification code;
   detecting a second nuclear fuel identification code marked on the fuel assembly adjacent to the first nuclear fuel identification code by the ultrasonic wave sensor when the first nuclear fuel identification code can not be recognized based on the information derived from said optical sensor; and
   recognizing the second nuclear fuel identification code based on information derived from the ultrasonic wave sensor as the reading of the second nuclear fuel identification code.

5. A method according to claim 4, wherein the first nuclear fuel identification code and the second nuclear fuel identification code are marked on an upper tie plate of the nuclear fuel assembly, the fuel assembly including a lower tie plate and a plurality of fuel rods with opposite ends thereof held by the upper tie plate and the lower tie plate.

6. A method for reading a nuclear fuel identification code marked on a fuel assembly comprising the steps of:
   providing an optical sensor and an ultrasonic wave sensor;
   positioning an optical sensor for detecting the nuclear fuel identification code marked on the fuel assembly above the fuel assembly to be detected;
   detecting the nuclear fuel identification code by the optical sensor;
   terminating recognition for the nuclear fuel identification code when the nuclear fuel identification code can be recognized based on information derived from the optical sensor as the reading of the nuclear fuel identification code;
   positioning an ultrasonic wave sensor in place of the optical sensor above the fuel assembly when the nuclear fuel identification code can not be recognized based on the information derived from the optical sensor;
   detecting the nuclear fuel identification code by the ultrasonic wave sensor; and
   recognizing the nuclear fuel identification code based on information derived from the ultrasonic wave sensor as the reading of the nuclear fuel identification code.

7. A method according to claim 6, wherein the nuclear fuel identification code marked on the fuel assembly is marked on an upper tie plate of the fuel assembly, the fuel assembly including a lower tie plate and a plurality of fuel rods having opposite ends thereof held by the upper tie plate and the lower the plate.

8. A method according to claim 7, wherein the nuclear fuel identification code includes a first nuclear fuel identification code detectable by the optical sensor and a second nuclear fuel identification code of a different expression from that of the first nuclear fuel identification code marked adjacent to the first nuclear fuel identification code and detectable by the ultrasonic wave sensor.

* * * * *